(12) United States Patent
Bailey et al.

(10) Patent No.: US 11,875,458 B2
(45) Date of Patent: Jan. 16, 2024

(54) FAST AND DEEP FACIAL DEFORMATIONS

(71) Applicant: DreamWorks Animation LLC, Glendale, CA (US)

(72) Inventors: Stephen Bailey, Berkeley, CA (US); Dalton Omens, San Diego, CA (US); Paul DiLorenzo, La Verne, CA (US); James O'Brien, El Cerrito, CA (US)

(73) Assignee: DREAMWORKS ANIMATION LLC, Glendale, CA (US)

( * ) Notice: Subject to any disclaimer, the term of this patent is extended or adjusted under 35 U.S.C. 154(b) by 0 days.

(21) Appl. No.: 17/661,527

(22) Filed: Apr. 29, 2022

(65) Prior Publication Data

US 2022/0262073 A1    Aug. 18, 2022

Related U.S. Application Data

(63) Continuation of application No. 17/065,423, filed on Oct. 7, 2020, now Pat. No. 11,348,314.

(60) Provisional application No. 63/022,398, filed on May 8, 2020.

(51) Int. Cl.
| | |
|---|---|
| *G06T 13/40* | (2011.01) |
| *G06T 17/20* | (2006.01) |
| *G06T 3/40* | (2006.01) |
| *G06N 3/08* | (2023.01) |
| *G06N 3/045* | (2023.01) |

(52) U.S. Cl.
CPC ........... *G06T 17/205* (2013.01); *G06N 3/045* (2023.01); *G06N 3/08* (2013.01); *G06T 3/4007* (2013.01); *G06T 3/4046* (2013.01); *G06T 13/40* (2013.01); *G06T 2207/20076* (2013.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 6,573,890 B1* | 6/2003 | Lengyel | .............. G06T 9/001 |
| | | | 345/418 |
| 7,263,231 B2 | 8/2007 | Jiang et al. | |
| 8,614,714 B1 | 12/2013 | Koperwas et al. | |
| 2008/0231640 A1 | 9/2008 | Pighin et al. | |
| 2010/0141663 A1* | 6/2010 | Becker | .............. G06T 13/40 |
| | | | 715/764 |

(Continued)

OTHER PUBLICATIONS

PCT International Application No. PCT/US2021/030024, International Search Report and Written Opinion dated Oct. 19, 2021, 16 pages.

(Continued)

*Primary Examiner* — Joni Hsu
(74) *Attorney, Agent, or Firm* — LEE, HONG, DEGERMAN KANG & WAIMEY

(57) ABSTRACT

According to at least one embodiment, a method for generating a mesh deformation of a facial model includes: generating a first plurality of deformation maps by applying a first plurality of neural network-trained models; extracting a first plurality of vertex offsets based on the first plurality of deformation maps; and applying the first plurality of vertex offsets to a neutral mesh of the facial model to generate the mesh deformation of the facial model.

17 Claims, 19 Drawing Sheets

(56) References Cited

U.S. PATENT DOCUMENTS

| | | | |
|---|---|---|---|
| 2015/0022517 A1* | 1/2015 | Jutan | G06T 13/40 |
| | | | 345/419 |
| 2016/0180568 A1 | 6/2016 | Bullivant et al. | |
| 2016/0300377 A1 | 10/2016 | Lee et al. | |
| 2018/0033189 A1 | 2/2018 | Ma et al. | |
| 2019/0073826 A1* | 3/2019 | Bailey | G06T 17/20 |
| 2019/0114818 A1 | 4/2019 | Lin et al. | |
| 2020/0286284 A1* | 9/2020 | Grabli | G06T 13/40 |
| 2021/0158937 A1* | 5/2021 | Wu | G06V 10/82 |
| 2021/0350621 A1 | 11/2021 | Bailey et al. | |

OTHER PUBLICATIONS

Bailey et al., "Fast and Deep Facial Deformations," ACM Transactions on Graphics, vol. 39, No. 4, Article 94, Jul. 2020, 15 pages.

U.S. Appl. No. 17/065,423, Office Action dated Sep. 29, 2021, 27 pages.

U.S. Appl. No. 17/065,423, Notice of Allowance dated Jan. 31, 2022, 21 pages.

Martin Abadi, et al., TensorFlow: "Large-Scale Machine Learning on Heterogeneous Systems", 2015, https://www.tensorflow.org/ Software available from tensorflow.org.

Andreas Aristidou, et al., 2018, Inverse Kinematics Techniques in Computer Graphics: A Survey. Computer Graphics Forum 37 (Sep. 2018), 35-58; https://doi.org/10.1111/cgf.13310.

Stephen W. Bailey, et al., 2018, Fast and Deep Deformation Approximations. ACM Trans. Graph, 37, 4, Article 119, Jul. 2018. 12 pages, https://doi.org/10.1145/3197517.3201300.

Vadim Besedin, et al, 2018, Ray Character Rig. CGTarian Animation & VFX Online School. https://www.cgtarian.com/maya-character-rigs/download-free-3d-character-ray.html.

Bernd Bickel, et al., 2008. Pose-space Animation and Transfer of Facial Details. In Proceedings of the 2008 ACM SIGGRAPH/ Eurographics Symposium on Computer Animation (SCA'08). Eurographics Association. Aire-la-Ville, Switzerland, 57-66. http://dl.acm.org/citation.cfm?id=1632592.1632602.

Davide Boscaini, et al., 2016, Learning Shape Correspondence with Anisotropic Convolutional Neural Networks. In Proceedings of the 30th International Conference on Neural Information Processing Systems (NIPS'16). Curran Associates Inc., Red Hook, NY.

Samuel R. Buss et al., 2005., Selectively Damped Least Squares for Inverse Kinematics. Journal of Graphics Tools 10, 3 (2005), 37-49. https://doi.org/10.1080/2151237X.2005.10129202 arXiv:https://doi.org/10.1080/2151237X.2005.10129202.

Matthew Cong, et al. 2015. Fully Automatic Generation of Anatomical Face Simulation Models. In Proceedings of the 14th ACM SIGGRAPH/ Eurographics Symposium on Computer Animation (SCA'15). ACM, New York, 175-183. https://doi.org/10.1145/2786784.2786786.

Wei-Wen Feng, et al. 2008. Real-time Data Driven Deformation Using Kernel Canonical Correlation Analysis. ACM Trans. Graph. 27, 3, Article 91 (Aug. 2008), 9 pages. https://doi.org/10.1145/1360612.1360690.

Yao Feng, et al. 2018. Joint 3D Face Reconstruction and Dense Alignment with Position Map Regression Network. CoRRabs/1803.07835 (2018). arXiv: 1803.07835 http://arxiv.org/abs/1803.07835.

Zhen-Hua Feng, et al. 2017. Wing Loss for Robust Facial Landmark Localisation with Convolutional Neural Networks. 2018, IEEE/CVF Conference on Computer Vision and Pattern Recognition (2017), 2235-2245.

Pablo Garrido, et al, 2016. Reconstruction of Personalized 3D Face Rigs from Monocular Video. ACM Trans. Graph 35, 3, Article Article 28 (May 2016), 15 pages. https://doi.org/10.1145/2890493.

Michael Girard, et al., 1985, Computational Modeling for the Computer Animation of Legged Figures. In Proceedings of the 12th Annual Conference on Computer Graphics and Interactive Techniques (SIGGRAPH '85). ACM, New York, NY, 263-270. https://doi.org/10.1145/325334.325244.

Fabian Hahn, et al., 2012. Rig-space Physics. ACM Trans. Graph. 31, 4 Article 72, Jul. 2012, 8 pages. https://doi.org/10.1145/2185520.2185568.

Fabian Hahn, et al., 2013. Efficient Simulation of Secondary Motion in Rig-Space. In Proceedings of the 12th ACM SIGGRAPH/ Eurographics Symposium on Computer Animation (SCA'13), ACM, New York, 165-171. https://doi.org/10.1145/2485895.2485918.

Rana Hanocka, et al., 2019. MeshCNN: A Network with an Edge. ACM Trans. Graph. 38, 4, Article Article 90 (Jul. 2019), 12 pages. https://doi.org/10.1145/3306346.3322959.

Daniel Holden, et al., 2017, Learning Inverse Rig Mappings by Nonlinear Regression. IEEE Transactions on Visualization and Computer Graphics 23, 3, (Mar. 2017), 1167-1178. https://doi.org/10.1109/TVCG.2016.2628036.

Alexandru-Eugen Ichim, et al. 2017. Phace: Physics-based Face Modeling and Animation. ACM. Trans. Graph. 36, 4, Article 153 (Jul. 2017), 14 pages. https://doi.org/10.1145/3072959.3073664.

Ning Jin, et al., 2018. A Pixel-Based Framework for Data-Driven Clothing. CoRR abs/1812.01677 (2018). arXiv:181201677 http://arxiv.org/abs/1812.01677.

Ladislav Kavan, et al. 2007. Skinning with Dual Quaternions. In Proceedings of the 2007 Symposium on Interactive 3D Graphics and Games, ACM, New York, 39-46. https://doi.org/10.1145/1230100.1230107.

Diederik Kingma, et al., 2014. Adam: A Method for Stochastic Optimization. International Conference on Learning Representations (Dec. 2014).

J. Kleiser, 1098. A fast, efficient, accurate way to represent the human face. In SIGGRAPH'89 Course Notes 22: State of the Art in Facial Animation.

Paul G. Kry, et al., 2002. EigenSkin: Real Time Large Deformation Character Skinning in Hardware. In Proceedings of the 2002 ACM SIGGRAPH/Eurographics Symposium on Computer Animation (SCA'02). ACM, New York, 153-159. https://doi.org/10.1145/545261.545286.

Zorah Lahner, et al., 2018. DeepWrinkles: Accurate and Realistic Clothing Modeling. CoRR abs/1808.03417 (2018). arXiv:1808.03417 http://arxiv.org/abs/1808.03417.

Samuli Laine, et al., 2017. Production-Level Facial Performance Capture Using Deep Convolutional Neural Networks. In Proceedings of the ACM SIGGRAPH/ Eurographics Symposium on Computer Animation (SCA'17). Association for Computing Machinery, New York, Article Article 10, 10 pages https://doi.org/10.1145/3099564.3099581.

Binh Huy Le, et al., 2012. Smooth Skinning Decomposition with Rigid Bones. ACM Trans. Graph. 31, 6, Article 199 (Nov. 2012), 10 pages. https://doi.org/10.1145/2366145.2366218.

Binh Huy Le, et al., 2014. Robust and Accurate Skeletal Rigging from Mesh Sequences. ACM Trans. Graph. 33, 4, Article 84 (Jul. 2014), 10 pages. https://doi.org/10.1145/2601097.2601161.

J.P. Lewis, et al., 2010. Direct Manipulation Blendshapes. IEEE Computer Graphics and Applications 30, 4 (Jul. 2010), 42-50. https://doi.org/10.1109/MCG.2010.41.

J.P. Lewis, et al., 2000. Pose Space Deformation: A Unified Approach to Shape Interpolation and Skeleton-driven Deformation: A Unified Approach to Shape Interpolation and Skeleton-driven Deformation. In Proceedings of the 27th Annual Conference on Computer Graphics and Interactive Techniques (SIGGRAPH'00). ACM Press/ Addision-Wesley Publishing Co., New York, 165-172. https://doi.org/10.1145/344779.344862.

Hao, Li., et al., 2010, Example-based Facial Rigging, In ACM SIGGRAPH 2010 Papers (SIGGRAPH'10). ACM. New York, Article 32, 6 pages. https://doi.org/10.1145/1833349.1778769.

Or Litany, et al., 2017. Deformable Shape Completion with Graph Convolutional Autoencoders. CoRRabs/1712.00268 (2017). arXiv: 1712.00268. http://arxiv.org/abs/1712.00268.

N. Magnenat-Thalmann, et al., 1988. Joint-dependent Local Deformations for Hand Animation and Object Grasping. In Proceedings on Graphics Interface'88. Canadian Information Processing Society, Toronto, Ont., Canada, 26-33. http://dl.acm.org/citation.cfm?id=102313.102317.

Jonathan Masci, et al., 2015. Geodesic Convolutional Neural Networks on Riemannian Manifolds. In Proceedings of the 2015 IEEE

(56) References Cited

OTHER PUBLICATIONS

International Conference on Computer Vision Workshop (ICCVW)(ICCVW'15), IEEE Computer Society, USA, 832-840. https://doi.org/10.1109/ICCVW.2015.112.

Alex Mohr, et al., 2003. Building Efficient, Accurate Character Skins from Examples. In ACM SIGGRAPH 2003 Papers (SIGGRAPH'03). ACM, New York, 562-568. https://doi.org/10.1145/1201775.882308.

Tornohiko Mukai and Shigeru Kuriyama. 2005. Geostatistical Motion Interpolation. In ACM SIGGRAPH 2005 Papers (SIGGRAPH'05). ACM, New York, 1062-1070. https://doi.org/10.1145/1186822.1073313.

Thomas Neumann, et al., 2013. Sparse Localized Deformation Components. ACM Trans. Graph. 32, 6, Article 179 (Nov. 2013), 10 pages. https://doi.org/10.1145/2508363.2508417.

Frederick I. Parke. 1972. Computer Generated Animation of Faces. In Proceedings of the ACM Annual Conference—vol. 1 (ACM'72), ACM, New York, 451-457. https://doi.org/10.1145/800193.569955.

Frederick Ira Parke. 1974. A Parametric Model for Human Faces. Ph.D. Dissertation. AAI7508697.

Sven Pohle, et al., 2015. DreamWorks Animation Facial Motion and Deformation System. In Proceedings of the 2015 Symposium on Digital Production (DigiPro'15). Association for Computing Machinery, New York, 5-6. https://doi.org/10.1145/2791261.2791262.

Anurag Ranjan, et al., 2018. Generating 3D Faces Using Convolutional Mesh Autoencoders. In Computer Vision—ECCV 2018, Vittorio Ferrari, Martial Hebert, Cristian Sminchisescu, and Yair Weiss (Eds.), Springer International Publishing, Cham, 725-741.

Charles F. Rose III, et al., 2001. Artist-Directed Inverse-Kinematics Using Radial Basis Function Interpolation. Computer Graphics Forum 20, 3 (2001), 239-250. https://doi.org/10.1111/1467-8659.00516 arXiv:https://onlinelibrary.wiley.com/doi/pdf/10.1111/1467-8659.00516.

Jaewoo Seo, et al., 2011. Compression and Direct Manipulation of Complex Blendshape Models. ACM Trans. Graph. 30 (Dec. 2011), 164. https://doi.org/10.1145/2070781.2024198.

Eftychios Sifakis, et al., 2005., Automatic Determination of Facial Muscle Activations from Sparse Motion Capture Marker Data. In AM SIGGRAPH 2005 Papers (SIGGRAPH'05). ACM. New York, 417-425. https://doi.org/10.1145/1186822.1073208.

Ayan Sinha, Jing Bai, et al., 2016. Deep Learning 3D Shape Surfaces Using Geometry Images. In Computer Vision—ECCV 2016, Bastian Leibe, Jiri Matas, Nicu Sebe, and Max Welling (Eds.), Springer International Publishing, Cham, 223-240.

Jean-Marc Thiery, et al., 2016, Animated Mesh Approximation With Sphere-Meshes. ACM Trans. Graph. 35, 3, Article 30 (May 2016), 13 pages, https://doi.org/10.1145/2898350.

Xiaohuan Corina Wang et al. 2002. Multi-weight Enveloping: Least-squares Approximation Techniques for Skin Animation. In Proceedings of the 2002 ACM SIGGRAPH/Eurographics Symposium on Computer Animation (SCA'02). ACM, New York, 129-138. https://doi.org/10.1145/545261.545283.

Martin Watt, et al., 2012. LibEE: A Mutithreaded Dependency Graph for Character Animation. In Proceedings of the Digital Production Symposium (DigiPro'12). ACM, New York, 59-66. https://doi.org/10.1145/2370919.2370930.

Chris J. Welman, 1993. Inverse Kinematics and Geometric Constraints for Articulated Figure Manipulation. PhD. Dissertation. Simon Fraser University.

Xian Xiao, et al., 2006, A Powell Optimization Approach for Example-Based Skinning in a Production Animation Environment. Computer Animation and Social Agents (Dec. 2006).

Li Zhang, et al., 2004, Space-time Faces: High Resolution Capture for Modeling and Animation. ACM Trans. Graph 23, 2 (Aug. 2004), 548-558. https://doi.org/10.1145/1015706.1015759.

Michael Zollhöfer, et al., 2018. State of the Art on Monocular 3D Face Reconstruction, Tracking, and Applications. Comput. Graph. Forum 37 (2018), 523-550.

\* cited by examiner (a) Input frame
(b) Target mesh

FAST AND DEEP FACIAL DEFORMATIONS

CROSS-REFERENCE TO RELATED APPLICATION(S)

This application is a continuation of U.S. patent application Ser. No. 17/065,423, filed on Oct. 7, 2020, now U.S. Pat. No. 11,348,314, which pursuant to 35 U.S.C. § 119(e), claims the benefit of U.S. Provisional Patent Application Ser. No. 63/022,398, filed on May 8, 2020, the contents of which are hereby incorporated by reference herein in their entirety.

BACKGROUND

Computer animation and other computer modeling applications combine two-dimensional (2D) or three-dimensional (3D) models of objects or characters and their corresponding programmed or keyframed movement. These models are constructed out of geometrical vertices, faces, and edges in a 3D coordinate system. One form of computer animation involves attaching a 3D model to a transformation hierarchy approximating a skeleton to dictate an object or a character's movement. The skeleton is surrounded by a surface mesh representing the object or character's boundaries. A 3D surface mesh may have a high level of resolution and include polygons, or faces, of various sizes making up the surface of the mesh, and the surface mesh may be shaped and deformed as required by an animator or other operator to achieve a desired result.

When comparing film-quality character rigs with rigs designed for real-time applications, there is a clear difference in the quality of the mesh deformations. Real-time rigs are limited by a computational budget and often trade realism for performance. Film-quality rigs do not have this same limitation, and character riggers can make the rig as complicated as necessary to achieve realistic deformations.

Specifically, the level of detail included in character rigs for interactive applications such as video games and virtual reality is limited by computational constraints (e.g., a mobile device may have less processing power than a network of computer servers). These types of rigs need to run in real-time, and therefore need to be able to evaluate at rates that support user interactivity without excessive delay. Because of this limitation, the character rigs often lack a high level of realism. Film-quality character rigs, on the other hand, are not as limited by computational constraints and their mesh deformations can appear much more realistic.

Because film-quality rigs require greater computational capacity, film-quality character rigs are not intended for interactive applications. A single film-quality rig may be able to run in real-time on high-end hardware after tremendous effort is spent to optimize and parallelize the rig evaluation. To increase the realism of interactive applications, it is desirable to use these high quality rigs but directly plugging computationally intensive rigs into an interactive application is impractical due to the interactive real-time requirements.

Thus, the existing systems and methods are unable to provide a solution for reducing the computation required for mesh deformations for film-quality rigs for use in real-time applications. Therefore, it is advantageous to determine mesh deformations for film-quality rigs (or near film-quality rigs) for use in real-time applications.

In addition, film-quality characters typically display highly complex and expressive facial deformation. The underlying rigs used to animate the deformations of a character's face are often computationally expensive, requiring high-end hardware to deform the mesh at interactive rates.

SUMMARY

Aspects of this disclosure are directed to rigs for faces (or heads) of characters. For example, a deep learning-based approximation method for complex film-quality facial rigs is disclosed according to at least one embodiment. The disclosed method significantly decreases deformation evaluation time, and it provides a differentiable model for use with inverse kinematics. According to at least one embodiment, the method uses convolutional neural networks (CNNs) for approximating the mesh deformations of characters' faces.

Embodiments of the present disclosure include systems and methods for approximating mesh deformations for character facial rigs. Embodiments of the present disclosure lead to significant reduction in evaluation time compared with the original deformation computation of film-quality character rigs. Various embodiments of this disclosure include a data-driven approach to learn a computationally less expensive approximation for character facial rigs that compresses the computation enough such that film-quality rigs are able to be approximated in real-time interactive applications.

According to at least one embodiment, a method for generating a mesh deformation of a facial model includes: generating a first plurality of deformation maps by applying a first plurality of neural network-trained models; extracting a first plurality of vertex offsets based on the first plurality of deformation maps; and applying the first plurality of vertex offsets to a neutral mesh of the facial model to generate the mesh deformation of the facial model.

According to at least another embodiment, a system for generating a mesh deformation of a facial model includes one or more controllers. The one or more controllers are configured to: generate a first plurality of deformation maps by applying a first plurality of neural network-trained models; extract a first plurality of vertex offsets based on the first plurality of deformation maps; and apply the first plurality of vertex offsets to a neutral mesh of the facial model to generate the mesh deformation of the facial model.

According to at least another embodiment, a machine-readable non-transitory medium has stored thereon machine-executable instructions for generating a mesh deformation of a facial model. The instructions include: generating a first plurality of deformation maps by applying a first plurality of neural network-trained models; extracting a first plurality of vertex offsets based on the first plurality of deformation maps; and applying the first plurality of vertex offsets to a neutral mesh of the facial model to generate the mesh deformation of the facial model.

According to at least another embodiment, a method for generating an approximation of a deformation of a facial model includes: providing a first plurality of vertices to a first network to produce a first rig parameter pose; providing a second plurality of vertices to a second network to produce a second rig parameter pose; and processing the rig parameter pose and the second rig parameter pose to produce a composite rig parameter pose, wherein the composite rig parameter pose corresponds to the approximation of the deformation of the facial model.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference may be made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

While this disclosure is presented in the context of 3D animation applications, it is not limited thereto, and other implementations of the systems, media, and methods described herein are contemplated, including deformation of geometric models within a 2D or 3D coordinate system, as well as for various interactive geometric modeling applications involving production and modification of geometric models, including, but not limited to, rigging, animation, architecture, automotive design, consumer product design, virtual reality applications, augmented reality applications, game development, visual effects, 3D printing, and the like. Any reference in this disclosure to a geometric model or components thereof, within a 3D model or 3D space will be understood to include the disclosure as applicable to 2D models and 2D spaces.

In this disclosure, the term "character," "object," or "model" may include any suitable computer representation or geometric model of part or all of an entity, such as a character, a landscape, an inanimate object, or any other virtual, modeled, and/or animated entity. Objects may be constructed, for example, out of geometrical vertices, edges, and/or faces in a 2D or 3D coordinate system.

A "point," "vertex," "edge," or "component" may include one of a set of elements used to determine the shape, movement, appearance, and/or absolute or relative positioning of a 3D model, including but not limited to vertices, points, edges, and faces of a 2D or 3D model. Any description of the present disclosure with respect to one of a point, a vertex, an edge, or a face will be understood to apply equally and/or analogously to the others of a point, a vertex, an edge, or a face where applicable, as will be understood by one of ordinary skill in the art, and use of one term over another within this disclosure will not be deemed to be limiting to only the term being used.

Figure 1A:
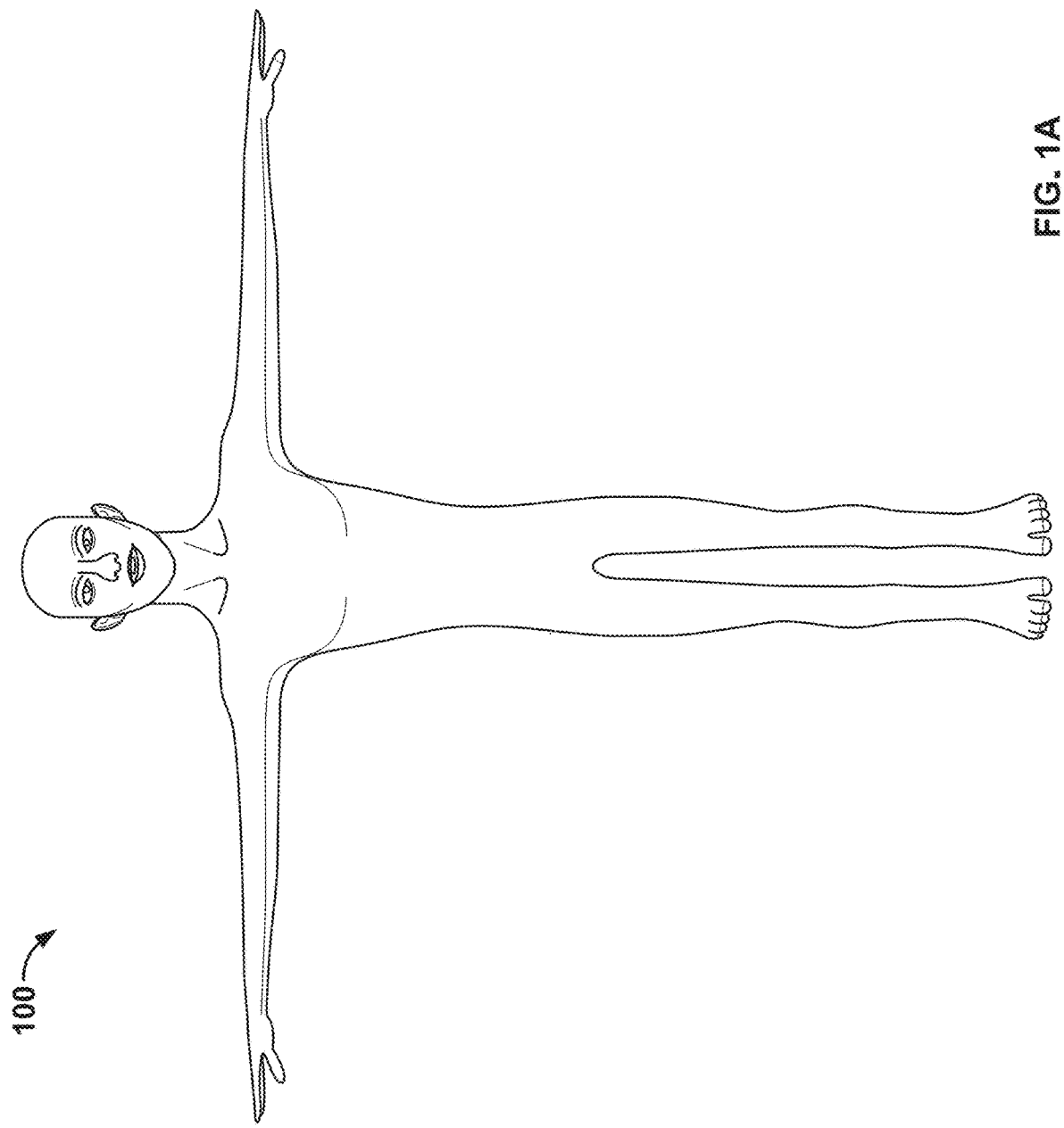
FIGS. 1A and 1B are illustrations of a mesh of a character model.

By way of background, most character rigs are designed with a motion system and a deformation system. The motion system is responsible for mapping rig parameters for some pose to a skeleton composed of bones and joints. The deformation system then maps the skeleton to the final mesh of the character for the input pose. FIG. 1A depicts an example of a 3D character 100 in a rest pose, or a "T" pose in this case, which may be configured to a rig. The rig may include skeletal bones and joints that provide points allowing for control and articulation by an artist or other operator.

Figure 1B:
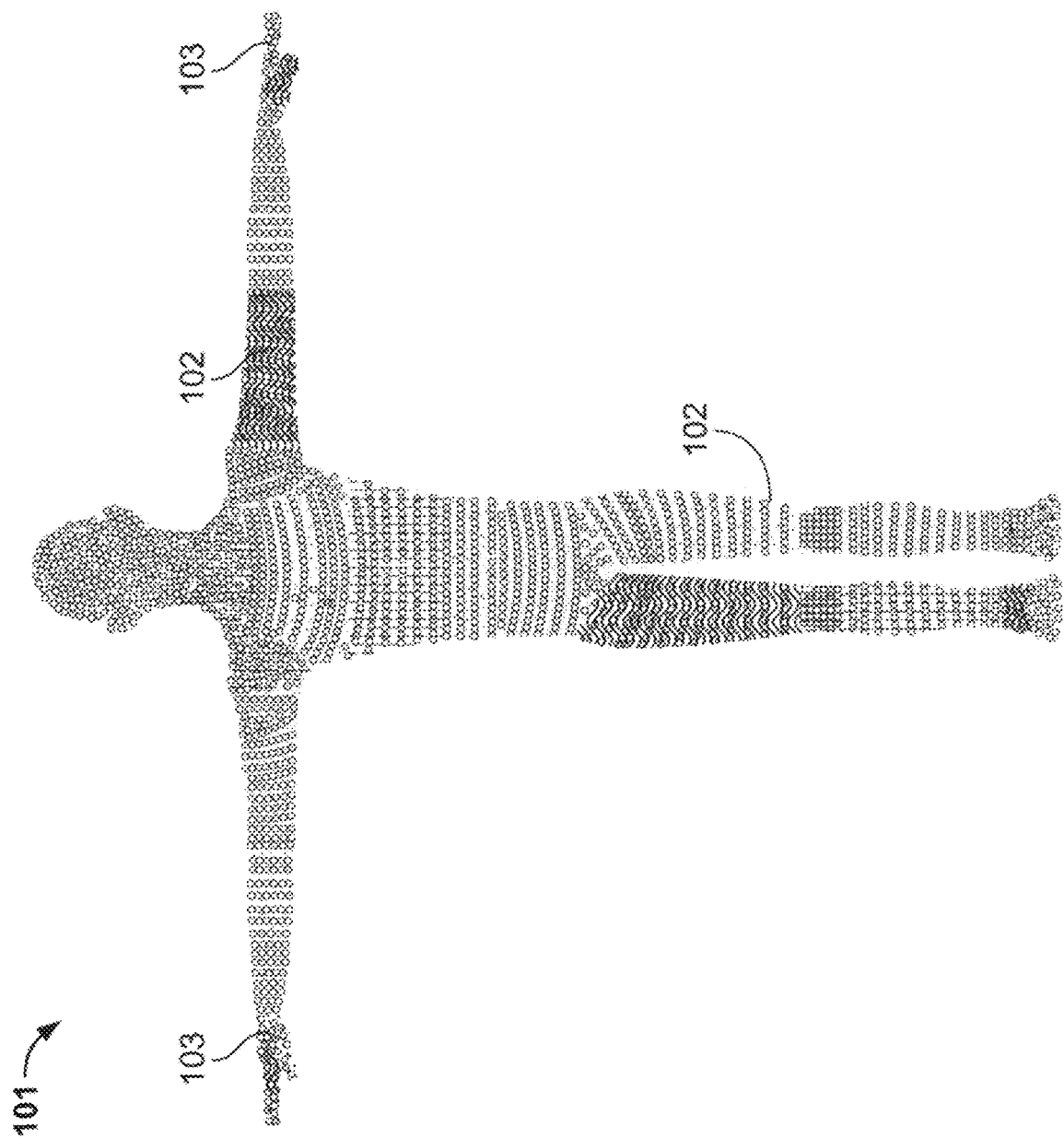

FIG. 1B shows an example of points, or vertices, of a character mesh 101 corresponding to the 3D character depicted in FIG. 1A. As shown in FIG. 1B, neighboring vertices of a mesh will often be grouped and assigned to the same bone of the skeleton. Additionally, a larger number of vertices 102—or vertices covering a wider area of the mesh—may be assigned to larger bones of the skeleton with less articulation detail (for example large bones of the arms and legs) whereas a smaller number of vertices 103—or vertices covering a smaller area of the mesh—may be assigned to smaller bones with greater articulation detail, for example smaller bones of the wrists, hands, and fingers.

Film-quality characters typically display highly complex and expressive facial deformation. The underlying rigs used to animate the deformations of a character's face (or, more generally, a character's head) are often computationally expensive, requiring high-end hardware to deform the mesh at interactive rates. Disclosed herein according to at least one embodiment is a method using neural networks for approximating the mesh deformations of a character's faces. According to at least one particular embodiment, one or more of such neural networks may be (or may include) a convolutional neural network (CNN). For the models that were tested, approximations may run up to 17 times faster than the original facial rig while still maintaining a high level of fidelity to the original rig.

Also disclosed, according to at least one embodiment, is an extension to the approximation for handling high-frequency deformations such as fine skin wrinkles. While the implementation of the original animation rig depends on an extensive set of proprietary libraries making it difficult to install outside of an in-house development environment, approximations according to disclosed embodiments may rely on the widely available and easily deployed TensorFlow libraries. In addition to allowing high frame rate evaluation on more modest hardware and in a wide range of computing environments, the large speed increase also enables interactive inverse kinematics on the animation rig. Approaches and their applicability will be demonstrated through interactive character posing and real-time facial performance capture.

Character facial rigs for video games and other real-time applications are often controlled by sets of bones or blendshapes. Although these rigging methods can be computed quickly, they generally sacrifice fine-scale details for speed. Expressing nuanced deformations with these real-time rigs is challenging and often requires additional computational layers added to the underlying rig. Some such additions for increasing the level of detail in the mesh deformation include pose space deformations and wrinkle maps. However, despite these improvements, the level of detail in film-quality facial rigs is noticeably better when compared with real-time rigs. The primary reason why film-quality facial rigs contain more sophisticated mesh deformations is because they are not constrained by the same real-time requirements.

Facial rigs for film require a significant amount of computation to create realistic and expressive mesh deformations. These facial rigs might run at a rate of only 10-30 FPS (frames per second) when evaluated on a high-end machine, and would run more slowly on consumer-level devices. Furthermore, entities such as animation studios typically develop in-house rigging software on which their characters are developed. These rigs are limited to their custom animation engines, and porting a character for use outside of the in-house software can be challenging and time-consuming. Thus, due to computational limits and portability, film-quality characters are rarely used outside of the film for which they are designed.

A method to approximate body deformations of film-quality character rigs has been proposed. However, that method uses an underlying skeleton to approximate the deformations. Unlike body rigs, facial rigs do not have an extensive skeletal structure that can be utilized for the deformation approximation. For example, facial features such as those corresponding to regions around the nose, eyes or mouth may not have extensive skeletal structure that can be utilized.

Aspects of this disclosure are directed to addressing this limitation. For example, according to at least one embodiment, a method for approximating deformations of facial meshes is disclosed. The approximation accurately computes deformations of the facial mesh, including skin, mouth interior, teeth, and other structures. The approximation may use neural networks to take advantage of the types of deformations found in facial meshes. For example, a CNN is a type of neural network that may be employed. However, it is understood that other types of neural networks may be used. The method may compute the deformation in three separate parts: a first approximation (e.g., coarse approximation), an additional approximation (e.g., a refined approximation), and yet another approximation (e.g., an approximation for rigid components of the mesh). The method may preserve high-frequency detail in the mesh (see FIG. 2) while running up to 17 times faster than the production rigs that were tested.

Figure 2:
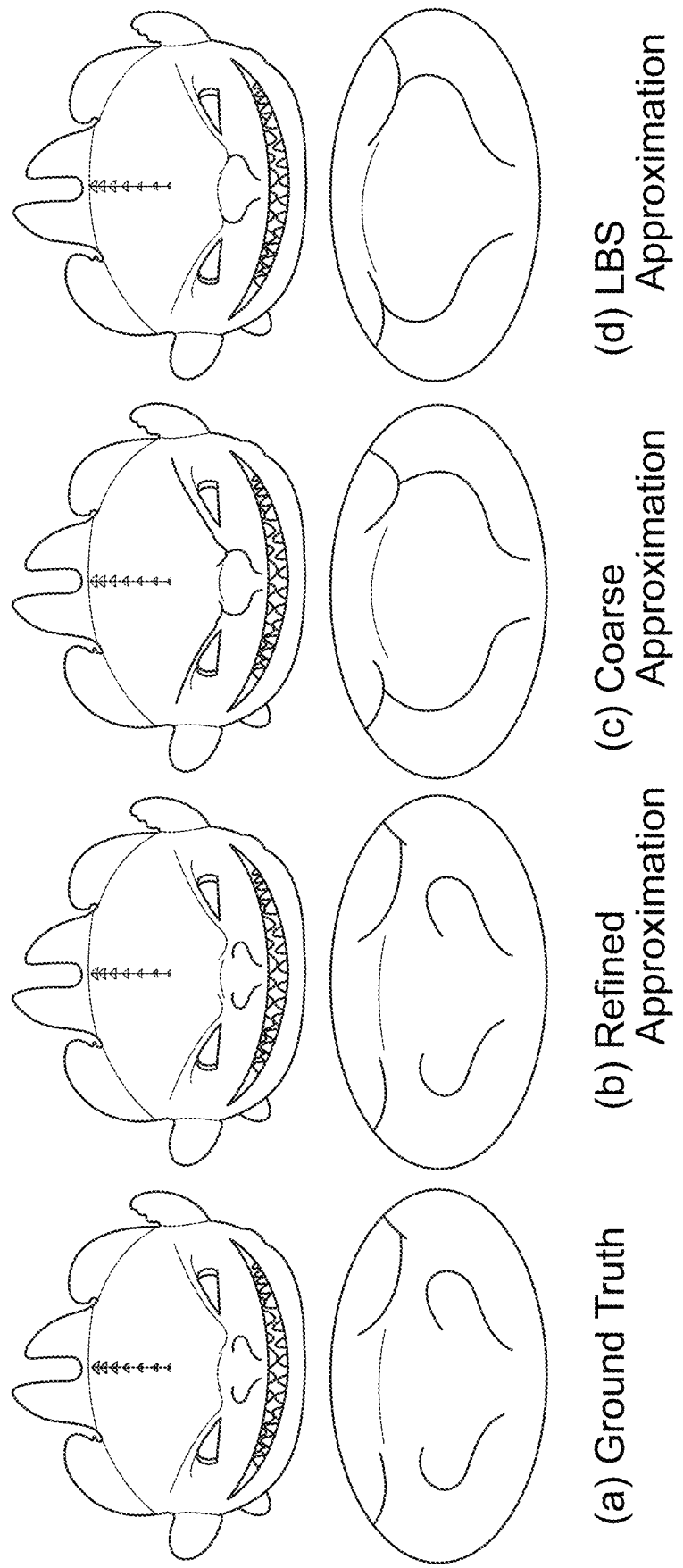
FIG. 2 illustrates a side-by-side comparison of facial mesh deformations including deformations approximated according to embodiments of the present disclosure.

FIG. 2 illustrates a side-by-side comparison of respective facial mesh deformations using a coarse approximation according to at least one embodiment (see FIG. 2(c)), using a refined approximation according to at least one embodiment (see FIG. 2(b)), as well as using an approximation generated by linear blend skinning (LBS) (see FIG. 2(d)). Techniques such as LBS compute deformation of a mesh from a rest pose as a weighted sum of the skeleton's bone transformations applied to each vertex. However, these deformations can suffer from volume loss known as the "candy wrapper" problem, and there are particular deformations which cannot be achieved with these techniques, for example, skin slide, muscle bulges, and cloth wrinkles.

FIG. 2(a) illustrates a final deformation achieved by calculating the full mesh function utilizing high performance computing hardware given unlimited (or extensive) time resources, and may be referred to as the "original deformation function" or "ground truth" deformation for the purposes of this discussion. Relative to the "ground truth" deformation of FIG. 2(a), the most noticeable differences, shown on the second row, can be observed around the nasal region of the mesh.

As noted earlier, approximation models according to at least one embodiment may be implemented in TensorFlow, an open-source machine learning library, which allows the facial rig to transcend the proprietary limitations of the original rigging software used to author the character and allows the model to be deployed on a wider variety of devices and applications. In addition, the rig approximation can more easily be evaluated on both the CPU and the GPU without any additional effort. Because models disclosed herein may be neural network-based, the corresponding approximations are fully differentiable. The usefulness of this property (or aspect) is demonstrated by developing an inverse kinematics-based posing application as well as a facial performance capture system.

Facial deformation systems for animated characters vary widely in their methods and complexity. Often, facial models combine multiple deformation methods to achieve their final result. One of the simplest and fastest ways to compute deformation is from an underlying skeleton. Skeleton subspace deformation (SSD), also called linear blend skinning (LBS), is popular due to its simplicity and speed. Due to the well-known shortcomings of SSD, including the candy-wrapper effect, improvements have been investigated such as multi-weight enveloping and dual-quaternion skinning, which improve the quality without noticeably impacting the evaluation speed. While this class of methods is often used as the base deformation system for a character's body, it is often combined with other methods to rig a character's face. A more common approach for a facial deformation system is blendshapes which linearly combines a set of artist-created facial expressions. This method is also fast to evaluate but is too limiting by itself for film-quality character rigs that could require hundreds of blendshapes to be keyed every frame in an animation. Another approach to construct a facial model is through physically-based deformation for better realism and ease of generating realistic poses. In complex facial models, all of these techniques and others may be combined which generally results in a high cost and low evaluation speed.

For real-time applications, it may be necessary to construct a facial deformation model which preserves detail without incurring too great a computational cost. One approach utilizes pose-space deformation in a hybrid approach which computes the base deformation using SSD and learns a model to compute high-fidelity, nonlinear details, like wrinkles, which are applied on top of the base. For efficient computation of physically-based deformation, one approach improves on rig-space physics for real-time results on production-quality character rigs. These approaches may be sufficient in achieving high performance for the systems they are built upon. However, at least one aspect of this disclosure is directed to finding an efficient representation for an existing high-quality rig, whose deformation model may be slow to compute on lower-powered hardware, without needing to optimize the complex character rig.

There exist different approaches to approximate an existing deformation model given a set of example poses. A goal of most of these approaches is to construct a more computationally efficient representation of the deformation function. One of the skinning decomposition methods finds the bone transformations and skin weights for a skeleton subspace deformation model given a set of example poses. Similarly, another approach also finds an SSD representation of the deformation, but organized in a skeletal hierarchy for easier animation afterwards. Another approach learns a skinned mesh via SSD from example data in order to animate with control points. For reasons explained earlier, a bone-based deformation system is not the best way to represent facial deformations. Therefore, such methods alone are not suitable with respect to at least some aspects considered herein.

Sphere-Meshes decompose a mesh animation into a set of animated spheres, which can be keyframed afterwards for animation. This approach is also unsuitable for high-quality character animation due to the difficulty of representing fine details. Specifically targeted at facial animation, another approach learns new parametric rig models like blendshapes from example poses. Another approach creates facial rigs based on statistical models such that the appearance of the rig closely matches the appearance of a recorded actor. All of these methods learn a completely new rig representation with different controls than those present in the original rig. At least one aspect of this disclosure is directed to approximating an existing facial rig and maintaining the same controls so that an artist would not be required to re-learn the control parameters.

Past research that attempts to approximate an existing rig function often assumes an underlying blendshape model or an underlying skeletal structure, while, according to at least one embodiment, our method does not make such strong assumptions about the facial rig. EigenSkin efficiently computes high-fidelity nonlinear deformation on GPU via an error-optimal pose-dependent displacement basis constructed from example meshes. This method assumes an underlying SSD representation of a given rig and uses it in its computation. One approach learns an augmented SSD skinning model with additional joints from an existing SSD rig. One approach assumes an underlying skeleton and uses the skeletal deformation as a base on which a fine-detail nonlinear displacement is overlaid. According to at least one embodiment, a deformation model is learned without requiring (or otherwise utilizing) assumption of a skeletal system, which is appropriate for complex facial rigs.

In order to support inverse kinematics (IK) for a facial rig in real-time, an efficient and accurate inversion of the rig function may be necessary to compute character poses given a set of constraints. In computer animation and robotics, inverse kinematics refers to a mathematical process of calculating the variable joint parameters that are needed to place the end of a kinematic chain (e.g., a robot manipulator or a skeleton of an animated character), in a given position and orientation relative to the start of the chain. Based on such joint parameters, the position and orientation of the chain's end (e.g., the hand of the character or robot) can typically be calculated directly using multiple applications of trigonometric formulas. This process is referred to as forward kinematics. However, in general, the reverse operation (i.e., inverse kinematics) can be much more challenging.

Inverse kinematics is also used to recover the movements of an object in the world from some other data, such as a film of those movements, or a film of the world as seen by a camera which is itself making those movements. This occurs, for example, where filmed movements of a human actor are to be duplicated by an animated character.

Due to the complexity of facial rigs, traditional solutions for the IK problem are not easily applicable to film-quality facial models due to the requirement of a differentiable rig function. There is research in computing blendshape parameters from landmarks. However, aspects of this disclosure are directed to seeking to allow for the inversion of an arbitrary black-box rig function.

Solutions to this problem have been explored. One approach utilizes an iterative optimization approach; however, this approach is not entirely rig-agnostic as it is designed to optimize the inversion of a pose-space deformation rig. Another approach successfully inverts a black-box rig function using two nonlinear methods: Gaussian process regression and feed-forward neural networks. In contrast, at least one aspect of this disclosure is directed to using deep-learning methods to approximate the original rig function. Due to the neural network, the gradient of the rig function can be estimated through the rig approximation, which can then be used to estimate the inverse rig function.

Deep convolutional methods have been developed for data-driven mesh regression problems. These methods utilize the power and flexibility of deep neural networks for applications ranging from facial reconstruction and facial animation to cloth simulation. One way to apply CNNs to meshes is by defining mesh convolution operations. One approach introduces graph convolutional autoencoders, while another uses a similar idea to generate 3D faces. MeshCNN defines specialized convolution and pooling operations on triangle meshes. Because at least one aspect of this disclosure is centered around improving efficiency, using such mesh convolutions would be too computationally expensive in this regard. Traditional CNNs operate on 2D images and feature maps. In order to reconstruct 3D deformations using these models, a mapping must be created between the feature map space and vertex positions. One approach applies convolutions to a mesh by parameterizing the mesh around a small local area. One approach applies CNNs by projecting a mesh onto a spherical domain and then "cutting up" the projection. Other approaches use texture coordinates (or UV coordinates) to map the vertex positions to 2D space. In this way, the networks learn to predict 2-dimensional feature maps, but they represent 3-dimensional coordinates. Convolutional neural networks have seen success due to the spatial coherence of vertex positions being preserved in transformed space. Other approaches have generated UV maps from perspective projections or scans. Because at least one aspect of our approach assumes a complete character rig, various embodiments disclosed herein use a UV map (or UV coordinates) created by an artist to compute vertex positions from a 2D feature space.

Features of various embodiments of the present disclosure will now be described in more detail.

Given a character's facial rig with a polygonal mesh, let V denote the set of vertex coordinates in the mesh with $|V|=n$ vertices. Let p represent the rig parameters of the characters, and let $V=r(p)$ be the rig function that maps the parameters to a deformed mesh. At least one embodiment of the present disclosure is directed to approximating this rig function r(p).

According to at least one embodiment, a method of approximating utilizes artist-created texture coordinates $U \in R^{n \times 2}$ of the facial mesh. The approximation may rely on CNNs, which generate deformation maps given input rig parameters.

According to at least one embodiment, the deformation map is a construct (e.g., a 3D image) having three channels of information. For purposes of description, it may be instructive to consider the deformation map as being similar to a color image that has three channels of color information. For example, for a particular pixel, such a color image may have red color information, green color information and blue color information. Similarly, according to at least one embodiment, a deformation map has, for a particular vertex, x-coordinate information, y-coordinate information and z-coordinate information. The x-, y- and z-coordinate information relate to a position of the vertex in the 3D image corresponding to the deformation map.

As such, a deformation map carries x-, y- and z-coordinate information for each of multiple pixels (e.g., each pixel of a 3D image). With regards to vertices of a mesh, the position of a particular vertex may not necessarily be aligned with the position of any particular pixel in the deformation map. Therefore, according to at least one embodiment, to determine a position of a vertex based on the deformation map, texture coordinates corresponding to the vertex may be used. By way of example, the texture coordinates of a particular vertex may be used to sample the deformation map, to identify particular pixels (e.g., neighboring pixels). For example, based on the texture coordinates, it may be determined that the particular vertex is located between (e.g., halfway between) the respective positions of two particular pixels of the deformation map. To determine the position of the vertex, weighted sums of the pixel information in the deformation map (e.g., a weighted sum of the x-coordinate information of the two pixels, a weighted sum of the y-coordinate information of the two pixels, a weighted sum of the z-coordinate information of the two pixels) may be used to determine an offset for the vertex position in the mesh.

Accordingly, the deformation maps are sampled at texture coordinates to approximate vertex positions in the mesh. Many parameters for a facial rig deform local regions of the mesh, and the rig parameters can be viewed as local operations on the mesh. By design, a CNN performs local computations on a feature map. Assuming that the local information in a mesh is preserved in the texture coordinates, a CNN may be ideal for approximating the rig function.

Figure 3:
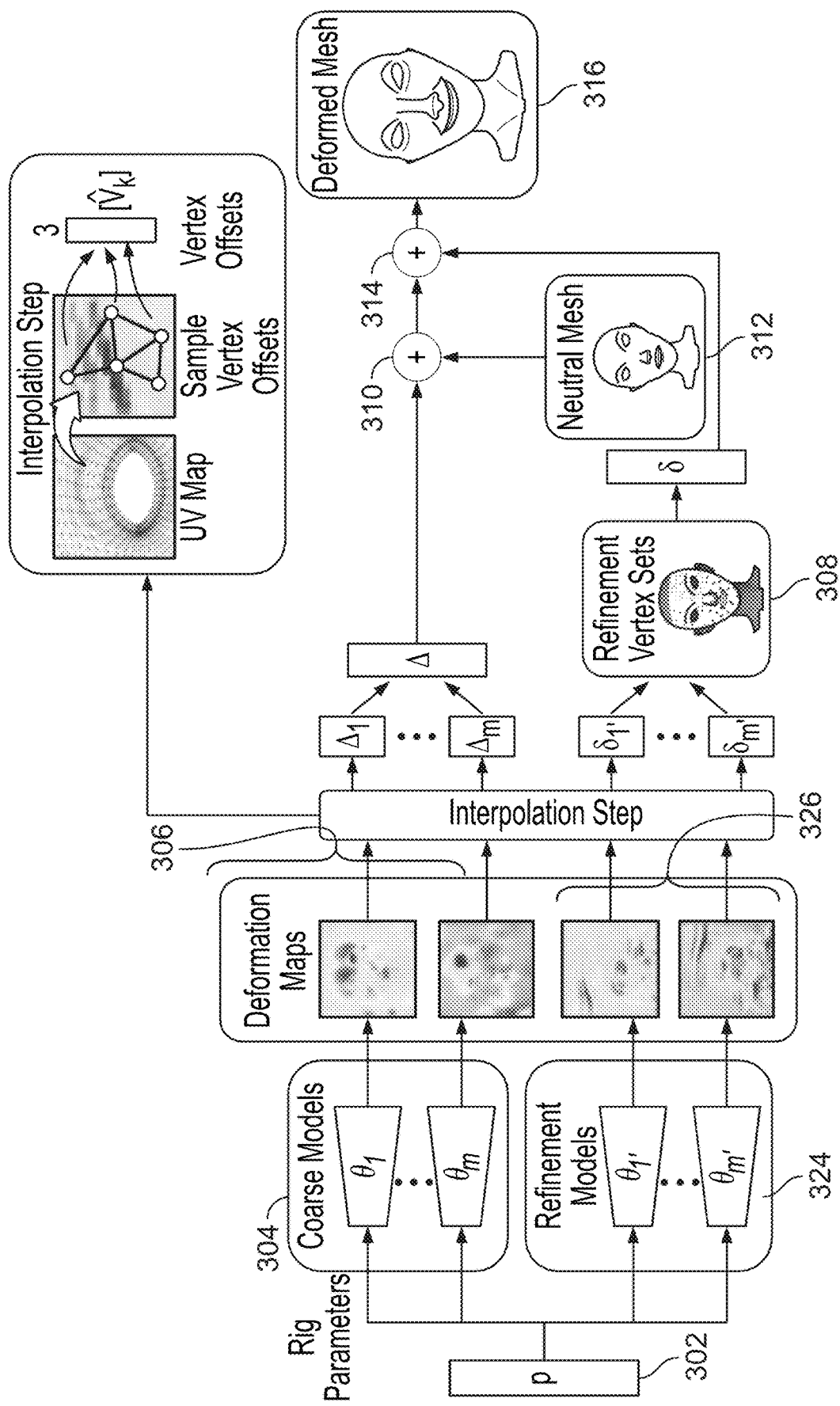
FIG. 3 is a diagram of an approximation model according to at least one embodiment.

According to at least one embodiment, a method for generating an approximated mesh deformation of a facial model includes two stages: a coarse approximation and a refined approximation (see FIG. 3). FIG. 3 is a diagram of an approximation model according to at least one embodiment. Rig parameters 302 are used as inputs to neural networks (e.g., convolutional neural networks) which generate a deformation map for each of one or more mesh segments. For example, one or more of the rig parameters 302 are input to convolutional networks in one or more coarse approximation models 304, which generate deformation maps 306. As another example, one or more of the rig parameters 302 are input to convolutional networks in refined approximation models 324, which generate deformations maps 326. In an aspect, the rig parameters 302 are not the models themselves but rather inputs used to influence the models to generate deformation maps. For example, the rig parameters 302 may include inputs for controlling movement in the lip, eye brow, nose, etc.

For each of the deformation maps, vertex offsets may be extracted by performing interpolation of the deformation map at each vertex position in texture coordinate space. For example, bilinear interpolation may be employed. According to at least one embodiment, with respect to each of the deformation maps 306 generated by the coarse approximation models 304, vertex offsets are extracted by bilinear interpolation of the deformation map at each vertex position in texture coordinate space. As described earlier, a particular vertex may be located between (e.g., halfway between) the respective positions of two pixels of a deformation map (e.g., one of the deformation maps 306). To determine the position of the vertex, weighted sums of the pixel information in the deformation map 360 may be used to determine the vertex position. For example, an average of the x-coordinate information of the two pixels, an average of the y-coordinate information of the two pixels, and an average of the z-coordinate information of the two pixels may be used to determine an offset for the vertex position in the mesh.

At adder 310, the extracted offsets are added to vertices of a neutral pose of a mesh 312 to reach a desired deformation.

Bilinear interpolation is but one example of a form of interpolation that may be employed to extract vertex offsets. It is understood that other form(s) of interpolation (e.g., cubic interpolation) may be employed.

The coarse approximation models 304 may operate on the entire mesh 312. To reduce a corresponding execution time (e.g., to ensure that the coarse approximation model executes more quickly), the coarse approximation model 304 includes multiple CNNs that output low resolution deformation maps (e.g., a deformation map 306 that is characterized by a relatively low resolution). As a result, high-frequency details in the deformation may be lost.

To address such a loss in detail, according to at least one particular embodiment, an approximated mesh deformation further includes refined approximation models 324. The refined approximation model 324 includes CNNs that output higher resolution deformation maps (e.g., deformation maps 326 that are characterized by a resolution that is higher than that of the deformation maps 306). As will be described in more detail below, the deformation maps 326 apply to fewer than all regions of the mesh 312. For example, the deformation maps 326 may apply to only selected regions of the mesh 312.

For example, with respect to each of the deformation maps 326 generated by the refined approximation models 324, vertex offsets are extracted by performing interpolation of the deformation map at each vertex position in texture coordinate space. In general, the structure of the deformation maps 326 may be similar to the structure described earlier with reference to the deformation maps 306. Similarly, the extraction of the vertex offsets based on the deformation maps 326 may be similar to that described earlier with reference to the deformation maps 306. As also described earlier with reference to the deformation maps 306, the interpolation may be bilinear, cubic, or some other suitable form of interpolation. In this regard, not more than particular subsets 308 of the total active vertices may be used. At adder 314, the extracted offsets are added to the output of the adder 310. At the output of the adder 314, vertices of a deformed mesh 316 are provided.

Accordingly, the refined approximation models 324 may focus only on vertex-dense regions of the mesh 312 to approximate these high-frequency deformations. To further improve the model's efficiency, according to at least one further embodiment, segments of the mesh that only undergo rigid rotations and translations within the rig function are identified. Such identified segments may be approximated with a faster rigid approximation instead of the more complex CNN approximation (e.g., the CNN-based approximations of the coarse approximation models 304 and of the refined approximation models 324).

Although FIG. 3 illustrates an approximation model including coarse approximation models 304 and refinement models 324, it is understood that an approximation model need not include both. By way of example, according to at least one embodiment, an approximation model includes one or more coarse approximation models 304 but not models similar to refinement models 324.

The coarse approximation models 304 will now be described in more detail with reference to at least one embodiment. A facial mesh (e.g., the mesh 312 of FIG. 3) may be divided into multiple segments, which is common for artist-created facial rigs. Each vertex of the mesh is assigned to a single mesh segment. As such, each vertex is assigned to no more than one mesh segment. m denotes the total number of mesh segments, and $V_k$ and $U_k$ denote, respectively, the set of vertex positions and the set of texture coordinates for a particular mesh segment k. Although features are described herein with reference to a mesh having multiple mesh segments, it is understood that the coarse approximation models 304 may also operate on a facial rig that is not segmented. In this situation, m would be equal to 1, and all vertices of the entire mesh would be assigned to the one and only segment.

The coarse approximation models 304 may compute the deformed mesh by first generating deformation maps 306, wherein one deformation map 306 is generated for each mesh segment in the facial rig. Vertex positions may then be computed based on the maps. For the mesh segment k, a corresponding function $I_k = f(p; \theta_k)$ computes a deformation map for the mesh segment given rig parameters p (e.g., rig parameters 302). The function $f$ may be a neural network (e.g., a CNN) consisting of several dense layers and convolutional layers, and the neural network may be parameterized by $\theta_k$ (see FIG. 3), where $\theta_k$ denotes the optimal model parameters for the mesh segment k.

Figure 4A:
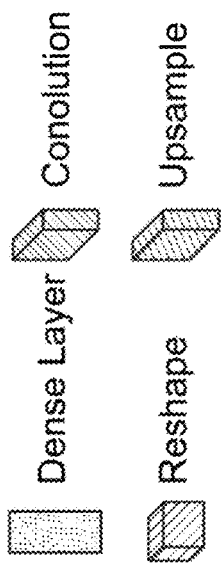
FIGS. 4A and 4B illustrate, respectively, an example of a neural network of a coarse approximation model and an example of a neural network of a refined approximation model according to one or more embodiments.

FIG. 4A illustrates an example of a neural network of a coarse approximation model according to at least one embodiment. With reference to FIG. 4A, the neural network includes dense layers 402-1 and 402-2 and convolutional layers 404-1, 404-2, 404-3 and 404-4. The convolutional layers 404-1, 404-2 and 404-3 use 3×3 kernels, and the last convolutional layer (convolutional layer 404-4) uses a 1×1 kernel. All layers but the last convolutional layer use the leaky ReLU activation function, and no activation function is applied to the last layer. All non-dense layers are square in the image plane.

Upsampling may be achieved through nearest-neighbor interpolation (see FIG. 3). Vertex offsets $\Delta_k$ are computed by sampling the deformation map computed by $I_k$ at texture coordinates $U_k$. The sampling is denoted as $\Delta_k = g(I_k; U_k)$, which outputs (or produces) the vertex offsets. Because each vertex is assigned to a single mesh segment, the vertex offsets for the full mesh may be obtained by concatenating the offsets for each segment such that $\Delta = U_{k \in \{1, \ldots, m\}} \Delta_k$. With continued reference to FIG. 3, the coarse approximation computes the final vertex positions for the mesh by adding (e.g., at adder 310) the vertex offsets to the vertices of the neutral pose of the mesh 312.

Given the approximation model, a loss function is defined to find the optimal model parameters $\theta_k$. According to at least one embodiment, a loss function is proposed that penalizes both inaccuracies in approximated vertex positions, as well as inaccuracies in face normals on the mesh. Given a target mesh V, and approximated vertex offsets $\Delta$, the loss function may be defined in Equation (1) as follows:

$$\mathcal{L}(V, \Delta) = \frac{1}{n} \sum_{i=1}^{n} \left\| v_i - \left(V^0 + \Delta\right)_i \right\|_1 + \alpha_n \frac{1}{f} \sum_{i=1}^{f} \|n_i - \tilde{n}_i\|_1 \quad (1)$$

where $\alpha_n$ is a scaling factor that may be hand-tuned by a user. Based on experimental data, it was determined that a scaling factor of $\alpha_n = 5$ works well.

In the loss function of Equation (1), $n_i$ denotes the normal of a face i in the mesh V, and $\tilde{n}_i$ denotes the normal of face i in the approximated mesh having vertex positions $V^0 + \Delta$ and a total of $f$ faces in the mesh topology. The L1 loss is used instead of the L2 loss because it produces sharper features. A mapping from rig parameters (e.g., rig parameters 302 of FIG. 3) to vertex offsets end-to-end is learned without requiring supervision on the intermediary deformation maps. Furthermore, according to at least one embodiment, the texture coordinates are not optimized. Instead, artist-created coordinates are relied upon.

Regarding a coarse approximation, examples of mesh segments for a particular mesh will be described in more detail later with reference to FIG. 8.

Because the coarse approximation model works on separate mesh segments, the model could produce discontinuities across boundaries and/or seams between particular mesh segments. To address (e.g., minimize) this potential problem, the error function (e.g., the loss function of Equation (1)) may strongly penalize inaccurate face normals, to encourage smooth (or smoother) results along mesh segment boundaries. Penalizing normal errors also suppresses low-amplitude, high-frequency errors that may be visually disturbing or distracting.

According to at least one embodiment, to assist with model training, each network may be provided with only a subset of the rig parameters (e.g., a subset of the rig parameters 302). The subset contains all of the rig parameters that can deform any vertex within the mesh segment that is being approximated. All other rig parameters (e.g., inputs that have no influence on the outputs) are excluded from the parameters that are input to the network. As a result, the network does not need to learn which parameters to ignore and will avoid being negatively affected by the noise provided by (or associated with) inputs that have no influence on the outputs.

In the coarse approximation model, the resolutions of the deformation maps $I_k$ are intentionally kept small (or relatively low) to reduce the computational complexity. However, in texture coordinate space, vertices in dense regions of the mesh could be placed (or spaced) less than a pixel apart in the small deformation maps. If such vertices undergo a high-frequency deformation, such as a skin wrinkle, then the coarse approximation model will likely be unable to recreate this deformation accurately. A bottleneck in this situation is the resolution of the map output by the CNN (e.g., the maps 306 output by the coarse approximation models 304). To address this limitation, according to at least one embodiment, refinement models (e.g., refined approximation models 324) are proposed for focusing exclusively on particular regions (e.g., vertex-dense regions) of the mesh.

The refined approximation models 324 will now be described in more detail with reference to at least one embodiment.

First, sets of vertices that correspond with regions of large (or larger) error in the approximation are identified. Vertex selection for the refinement model will be described in more detail later. Each set that is identified is then defined as a new mesh segment. For each vertex in such a new mesh segment, the texture coordinates are scaled to fill a full resolution of the refinement deformation maps (e.g., the maps 326 produced by the refined approximation models 324). As in the coarse approximation model, no vertex is assigned to multiple mesh segments (e.g., multiple new mesh segments that are defined for purposes of refined approximation).

Additionally, not every vertex of the mesh (e.g., mesh 312 of FIG. 3) is assigned to a new mesh segment with reference to the refinement stage. For example, only vertices located in regions of the mesh that have a high approximation error are assigned to new mesh segments.

Figure 4B:
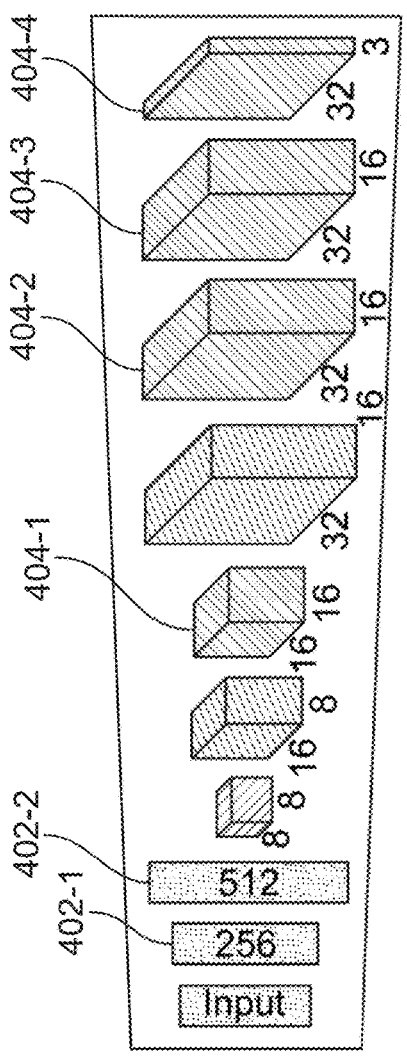
Figure 4B:
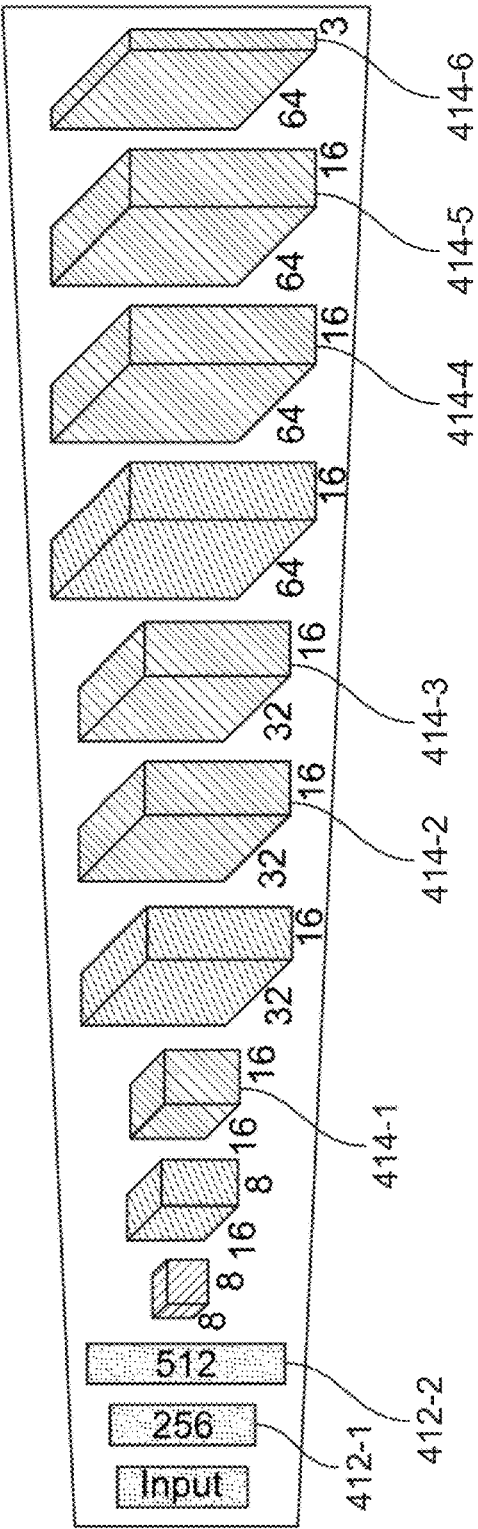

FIG. 4B illustrates an example of a neural network of a refined approximation model according to at least one embodiment. With reference to FIG. 4B, the neural network includes dense layers 412-1 and 412-2 and convolutional layers 414-1, 414-2, 414-3, 414-4, 414-5 and 414-6. The convolutional layers 414-1, 414-2, 414-3, 414-4 and 414-5 use 3×3 kernels, and the last convolutional layer (convolutional layer 414-6) uses a 1×1 kernel. All layers but the last convolutional layer use the leaky ReLU activation function, and no activation function is applied to the last layer. All non-dense layers are square in the image plane.

m' denotes the number of new mesh segments in the refinement stage, and $U_{k'}$ denotes the new texture coordinates for a particular new segment k'. Similar to the notation that was used earlier with respect to the coarse approximation model, sampling for the refined approximation model for the new mesh segment k' may be expressed as $\delta_{k'}=g(f(p; \theta_{k'}^r); U_{k'})$ where $\theta_{k'}^r$ denotes the optimal model parameters for the new mesh segment k'. The output $\delta_{k'}$ approximates a residual between the vertex positions in the mesh (e.g., mesh 312 of FIG. 3) and the output of the coarse model with respect to the new mesh segment k'. For vertices not contained in any of the new mesh segments, the refinement approximation may be considered as being equal to zero, and this set of refinement approximations may be defined as $\delta_{m'+1}=0$. Similar to the vertex offsets obtained for the full mesh in the coarse approximation model (denoted as $\Delta$), $\delta$ may be used to represent the combined set of outputs $\delta_{k'}$. The refinement models 324 may be trained using a same (or similar) loss function as that described earlier with reference to the coarse approximation model (see Equation 1), where the loss is now evaluated as $\mathcal{L}(V, \Delta+\delta)$.

Regarding a refined approximation, examples of new mesh segments for a particular mesh will be described in more detail later with reference to FIG. 9.

According to at least one embodiment, the refinement models produce deformation maps that feature a higher resolution relative to the deformation maps produced by the coarse models. Alternatively, the entire approximation may be performed by only applying the higher resolution refinement models across the entire mesh, and forgoing use of a coarse approximation. However, applying the refinement model across the entire mesh would result in a much higher computational cost, both because of a global increase in resolution and because the refinement model uses a deeper network (see, e.g., the larger number of convolutional networks in the refinement model illustrated in FIG. 4B).

Vertex selection for the refinement model will now be described in more detail with reference to at least one embodiment.

To identify the vertex sets used for refinement, the minimum approximation error for each vertex may be estimated given the resolution of the coarse deformation map and texture coordinates of each mesh segment. Next, clustering on the texture coordinates is performed, with each vertex weighted by its estimated approximation error. The vertices near each cluster become corresponding mesh segments for the refinement models. In contrast, vertices that are located far (or farther) from cluster centroids are omitted from the refinement stage.

The minimum approximation error may be estimated by first mapping vertex positions to a deformation map through the texture coordinates and then sampling the deformation map at the coordinates to generate vertex positions (sampled vertex positions). The map may be computed through polyharmonic interpolation with a linear kernel by interpolating values at pixel coordinates from the texture coordinates. Vertex positions are computed from the deformation maps through bilinear interpolation. $v_i$ may denote the original vertex position, and $\tilde{v}_i$ may denote the sampled vertex position from the deformation map. Over a set of n samples $V_i = \{v_i^1, v_i^2, \ldots, v_{i}^n\}$ the approximation error may be estimated as expressed in Equation (2) below:

$$e_i = \frac{1}{n}\sum_{j=1}^{n}\|v_i^j - \tilde{v}_i^j\|_2^2 \qquad (2)$$

Then, k-means clustering is performed on the texture coordinates with each vertex weighted by its corresponding approximation error $e_i$. The number of clusters may be determined by the elbow method. Here, each vertex is assigned to the nearest cluster centroid up to a user-specified distance. In experiments conducted, vertices were assigned within a square with a length of ¼ of the width of the original texture coordinate space and centered on the cluster means. This approach worked well for the characters that were tested. Similar to the coarse approximation, the set of rig parameters that can deform any vertex contained in these new mesh segments may be computed. Each refinement model may be provided with only those particular input parameters.

Features of a less computationally complex rigid approximation will now be described with reference to at least one embodiment.

In a character's face, there could be sections of the mesh that move rigidly, such as individual teeth, where vertices of a given tooth can be considered as moving together as a single unit. For characters that were tested, each tooth was modeled as a separate segment. Because the deformation of each tooth in the rig could be expressed as a rotation and translation, approximating the linear transformation with a CNN model for each tooth would produce unnecessary computation. Instead, the rigid movement may be estimated by computing a linear transformation from nearby vertices in the approximated mesh as illustrated in FIG. 5.

Figure 5:
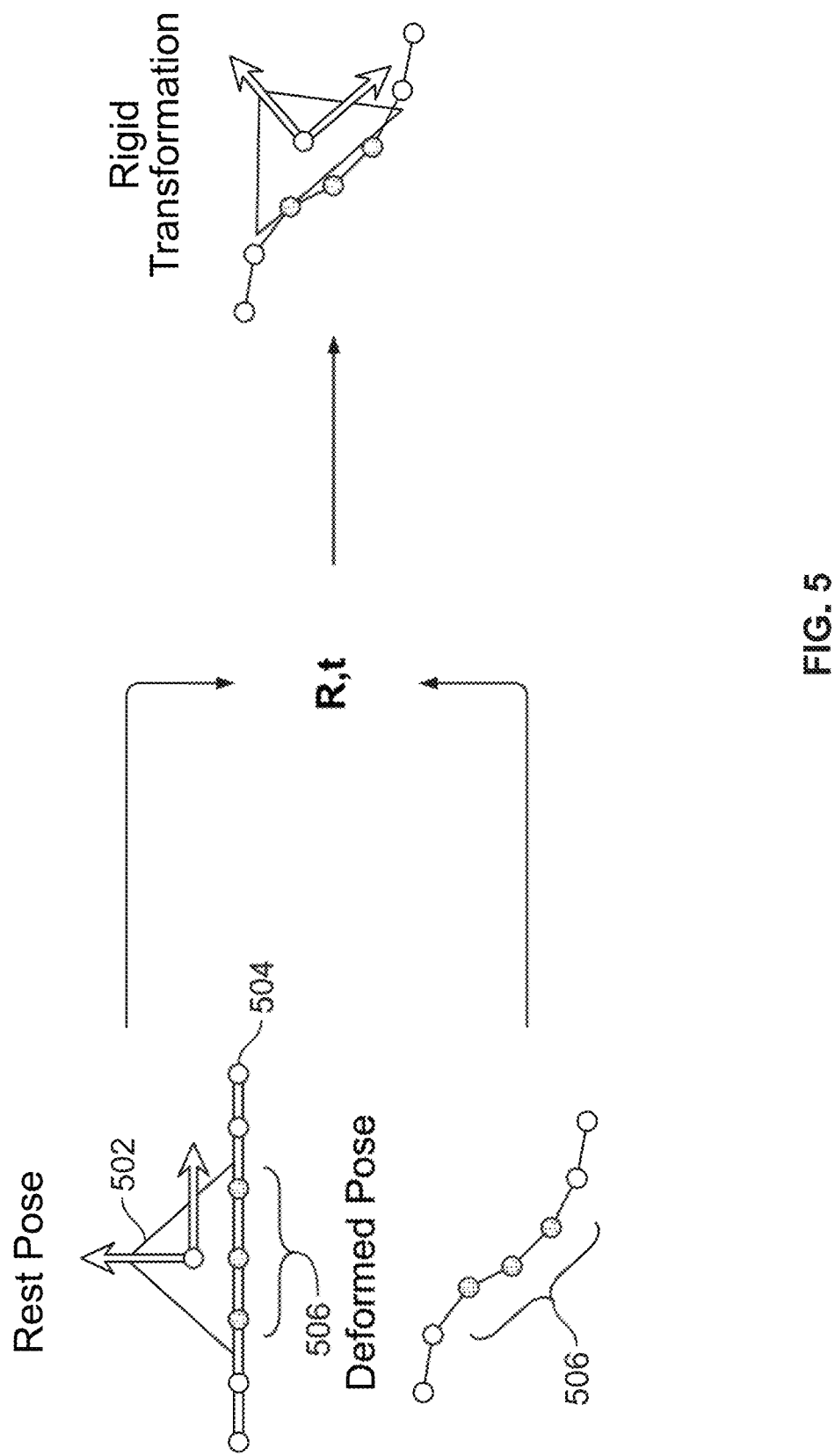
FIG. 5 illustrates an example of a rigid approximation according to at least one embodiment.

FIG. 5 illustrates an example of a rigid approximation according to at least one embodiment. A triangle 502 represents a rigid mesh segment, e.g., a rigid mesh segment as identified by Equation (3), which will be presented later. The line 504 represents a nonlinearly deformed mesh segment, and the dots on the line 504 represent vertices on the surface. In particular, the dots 506 represent the set of vertices identified by Equation (4) that best match the rigid transformation of the triangle 502 across a large set of examples. Given the rest pose as well as the positions of the vertices on the nonlinear segment 504 in a deformed pose, the transformation R,t is computed from the vertices represented by the dots 506.

The transformation is then applied to the triangle 502 to compute its position in the deformed pose. Each rigid mesh segment is assigned to a subset of vertices approximated by the CNN models. The motions of these rigid segments are then estimated by solving for the rigid transformation that best explains the movement of the corresponding subset of vertices from the CNN approximation. According to at least one embodiment, the rigid transformations are computed after the coarse and refinement approximations have been evaluated because the computation relies on the results of the approximation.

To identify the rigidly deformed segments of the mesh, all k mesh segments that are provided by the author of the facial rig are considered. Next, a set of n example mesh deformations $V=\{V^1, V^2, \ldots, V^n\}$ is collected. Given the mesh in a rest pose $V^0$, the approximation error of rigidly transforming vertex positions $V_k^0$ to $V_k^i$ is computed as expressed in Equation (3) below:

$$e_k^i = \min_{t_k^i, R_k^i} \|V_k^0 R_k^i + t_k^i - V_k^i\|_F^2 \quad \text{s.t.} \quad R_k^i \in SO(3) \quad (3)$$

Equation (3) indicates the difference in vertex positions for mesh segment k in sample i when applying a rigid rotation $R_k^i$ and translation $t_k^i$. The error across samples $$e_k = \frac{1}{n}\sum_{i=1}^{n} e_k^i$$

is averaged. Rigidly deformed mesh segments can then be identified where $e_k < \tau$. In experiments conducted, a value of $\tau = 0.3$ mm was used.

$V_r^i$ may denote a rigidly deformed mesh segment (i.e., $e_r < \tau$) for sample i. $R_r^i$ and $t_r^i$ may denote the minimizers of Equation (3). P may denote the set of vertex indices in the mesh that are not contained in any rigidly deformed segment. For each vertex $j \in P$, the approximation error under the transformation $R_r^i$, $t_r^i$ across all samples i is computed using Equation (4) below:

$$\epsilon_{r,j} = \frac{1}{n}\sum_{i=1}^{n} \|v_j^0 R_r^i + t_r^i - v_j^i\|_2^2 \quad (4)$$

For the rigid mesh segment r, $V_\delta^0$ and $V_\delta^i$ may denote the set of vertices with the c smallest approximation errors $\epsilon_{r,j}$ where $|V_\delta^0|=c$. In experiments conducted, a value of c=10 was chosen. Given the nonlinearly deformed vertices of a mesh $V'_P$, the vertex positions for rigid mesh segment r can be approximated as $V'_r = V_r^0 R'_\delta + t'_\delta$ where $R'_\delta$ and $t'_\delta$ are the minimizers of Equation (3) for the vertex positions $V'_\delta$.

Implementation of coarse and refined approximation models will now be described in more detail with reference to at least one embodiment.

All of the respective models $f(p;\theta_k)$ and $f(p;\theta_k^r)$ for the coarse approximation and the refinement stage may be implemented as deep neural networks with a series of dense layers followed by convolutional layers. FIGS. 4A and 4B illustrate, respectively, an example of a neural network of a coarse approximation model and an example of a neural network of a refined approximation model. The networks are trained across two stages. In a first stage, the parameters $\theta_k$ corresponding with the coarse approximation are trained to minimize the loss $\mathcal{L}(V, \Delta)$ as expressed in Equation (1). These models are trained with the Adam optimizer (See Diederik Kingma and Jimmy Ba. 2014. Adam: A Method for Stochastic Optimization. International Conference on Learning Representations (12 2014)) using the momentum parameters suggested by the authors and with a batch size of 8. Optimization starts with the learning rate at $10^{-3}$. After the model converges, the learning rate is reduced to $10^{-4}$. After convergence again, the learning rate is reduced to $10^{-5}$ and run until convergence once more. Once the parameters $\theta_k$ from the coarse approximation are fully optimized, they are held constant while, in a second stage, the refinement model parameters $\theta_k^r$ are optimized with the loss $\mathcal{L}(V, \Delta+\delta)$. The same (or similar) hyper-parameters and training schedule are used for optimization of the refinement model.

With training the approximation models, rigid mesh segments (see Equation (3)) and the sets of vertices assigned to each rigid mesh segment (see Equation (4)) are computed using the original rig function. During model evaluation, the rigid transformations are computed after the coarse and refinement models are evaluated. The approximated vertex positions are used to compute the rotation matrices and translation vectors, which are then applied to the rigid mesh segments to create the resulting approximated mesh deformation.

To train the facial approximation model according to at least one embodiment, a large set of training data may be needed. The training data consist of pairs (p, V) of rig parameters p and the vertex positions of the deformed mesh output by the rig function V=r(p). To generate the training data, existing animation may be augmented with multiplicative noise and data balancing may be applied to prevent common poses found in the animation data from being over-represented in the training data.

Figure 6:
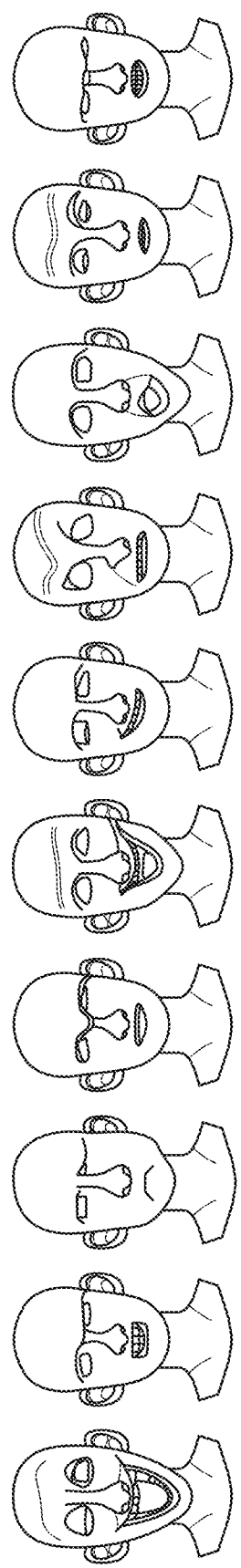
FIG. 6 illustrates example poses from training data.

$\mathcal{L}$ may denote the set of poses from the training animation, and m may denote the number of rig parameters in each pose. The training set may be denoted based on Equation (5) below $$\mathcal{T} = \{u \odot p | u \sim U(0.25, 3.0)^m, p \sim \mathcal{A}\} \quad (5)$$

where $u \in \mathbb{R}_m$ denotes a vector of random values with each component drawn uniformly at random in the range [0.25, 3.0] and p is drawn uniformly at random from the set of poses $\mathcal{A}$. The operation $\odot$ denotes component-wise multiplication of vectors. In conducted experiments, |T|=50,000 samples were generated for the training set. FIG. 6 shows example poses from the training data T.

After the training set is generated, the data is balanced. The training data may be generated from existing animation, and certain expressions, such as a neutral expression, might occur more frequently than other poses in the data. A model trained with this dataset may overfit to frequently occurring expressions and may perform poorly when approximating other types of expressions. According to at least one embodiment, the training examples are sorted into bins, and random samples are drawn by picking a bin uniformly at random and then picking a sample within the bin uniformly at random.

To divide the data into bins, a small set of landmark vertices around key facial features such as the mouth, eyes, and nose may be manually labeled. For example, in experiments conducted, roughly 20-30 landmark points for each character were manually identified. For each pose $p^i \in T$, the positions of the landmark vertices $V_l^i$ in the deformed mesh were gathered. Principal component analysis (PCA) is then used to project the set of landmark positions $\{V_l^1, V_l^2, \ldots, V_l^{|T|}\}$ onto a one-dimensional space. This one-dimensional space is segmented into intervals of equal length along the range of the projected data. The samples are then sorted into bins according to the interval in which they lie. When drawing samples for training, a bin is selected uniformly at random, and from that bin, a sample is selected uniformly at random. In experiments conducted, the data was divided into 16 bins.

Facial character rigs for production use are typically constructed in a manner such that computing the gradient of the vertex positions with respect to the rig parameters $\partial V/\partial p$ would be difficult and extremely slow. Using the approximation model(s) described herein according to at least embodiment, estimating the gradient becomes possible and may be trivial with automatic differentiation, which is a common feature in deep learning libraries. One useful application of this gradient is in inverse kinematics, where rig parameters are estimated to best deform the mesh in order to match user-specified control point positions.

Common solutions to inverse kinematics formulate it as an iterative optimization problem. These types of solutions would require multiple gradient evaluations before converging on the optimal rig parameters. Although the approximation model(s) can be used to estimate $\partial V/\partial p$, computing the gradient multiple times through the model(s) for an iterative optimization method requires too much computation to run in real-time. Instead, according to at least one embodiment, a feed-forward neural network is disclosed. The feed-forward neural network takes the IK control points as inputs and outputs the corresponding rig parameters. During training, the network utilizes the approximation gradient, but does not require $\partial V/\partial p$ when evaluated on new inputs. As a result, the feed-forward network can compute the desired rig parameters in real-time more readily.

A model of a feed-forward neural network will now be described with reference to at least one embodiment.

C may denote the set of indices of vertices corresponding to IK control points, and $r_C(p): R^m \to R^{|C| \times 3}$ may denote the rig function that maps the rig parameters p to the subset of vertices $V_C$. Then the inverse kinematics problem can be expressed in Equation (6) below $$p' = \arg\min_p \|r_C(p) - \overline{V}_C\|_F^2 \tag{6}$$

where $\overline{V}_C$ denotes the target control points provided by the user. Due to the assumption that the rig function r is not differentiable, the rig function is replaced with the approximation, denoted as $\tilde{r}$. Furthermore, instead of solving the minimization problem with an iterative algorithm, a feed-forward network $f_{IK}: R^{|C| \times 3} \to R^m$ is introduced, to approximate the minimization problem through a fixed-length computation such that $$f_{IK}(\overline{V}_C; \theta_{IK}) = \arg\min_p \|\tilde{r}_C(p) - \overline{V}_C\|_F^2 \tag{7}$$

where $\theta_{IK}$ denotes the network parameters that require training. The model is trained on a specific set of control points and vertices $V_C$, and a new network may need to be trained for any different set of vertices.

The loss function used to train the model contains both a point-matching component to ensure that the deformed mesh closely matches the control points, as well as a regularization component to avoid large rig parameters that would create unnatural poses. The loss is expressed as Equation (8) below $$\mathcal{L}(\overline{V}_C) = \mathcal{L}_{point}(\overline{V}_C) + \lambda_{reg} \mathcal{L}_{reg}(\overline{V}_C) \tag{8}$$

where $\lambda_{reg} \in R$ denotes a user-defined regularization weight.

The point-matching loss (see Equation (9)) computes the distance between the points generated by the estimated pose and the corresponding control points.

$$\mathcal{L}_{point}(\overline{V}_C) = \frac{1}{|C|} \sum_{i \in C} \|\tilde{r}_i(f_{IK}(\overline{V}_C; \theta_{IK})) - \overline{v}_i\|_1 \tag{9}$$

The regularization component penalizes large parameter values, as expressed in Equation (10) below $$\mathcal{L}_{reg}(\overline{V}_C) = \|(f_{IK}(\overline{V}_C; \theta_{IK})) - p^0) \odot s\|_1 \tag{10}$$

where $p^0$ denotes the neutral expression of the character and $s \in R^m$ denotes individual scaling values for each rig parameter. For rig parameter i, the scale is given by $s_i = 1/(p_{i,max} - p_{i,min})$ where $p_{i,max}$ and $p_{i,min}$ are the maximum and minimum values, respectively, for rig parameter i in the animation data $\mathcal{A}$. Scaling each parameter separately ensures that regularization is applied equally to each parameter regardless of the difference in their ranges of values. Furthermore, the L1 regularization loss is used to encourage sparsity in the estimated pose p.

An ideal IK approximation model $f_{IK}$ would avoid learning incorrect correlations between certain rig parameters and control points. For example, if a user were to adjust a control point on the left eye of a character, the approximation model should avoid changing rig parameters related to the region around the mouth. According to at least one embodiment, this property is achieved by designing the IK approximation model as a combination of multiple networks. The control points are divided into separate sets based on the regions of the face. For example, all of the points on the right eye of the character define one subset, and all of the points on the mouth define a separate subset. These points may be divided manually.

For example, the control points may be divided into k subsets, and $C_j$ may denote the control points in a particular subset j. According to at least one embodiment, the IK approximation model consists, in total, of k separate feed-forward networks. The input to the network j is the corresponding subset of control points $\overline{V}_{C_j}$, and the output is the set of rig parameters that can deform any of the vertices corresponding to the control points. Rig parameters can be estimated by multiple models. In this case, the final estimated value may be the average of the outputs. It is appreciated that more sophisticated methods could be used to compute the final value of rig parameters predicted by multiple networks.

However, averaging the values worked well with rigs used in various experiments that were conducted. For the characters' faces, only a small fraction of the rig parameters may be shared between IK models. Of the shared parameters, almost all of them control large-scale deformations of the face such as a squash or a stretch of the entire head. Because these controls drive large deformations across all regions of the mesh, IK models trained on control points for small portions of the mesh will generally agree on parameter values for these types of global deformations. Thus, reasonable results may be obtained by simply averaging these parameters.

According to at least one embodiment, each network of the IK approximation model may consist of three dense layers with 256 nodes in the first two layers and $|R_j|$ nodes in the final layer, where $R_j$ denotes the set of rig parameters estimated by IK model j. The leaky ReLU activation function is applied after the first and second layers. No activation is applied to the output of the final layer so that the network can output any value for the rig parameters.

Figure 7:
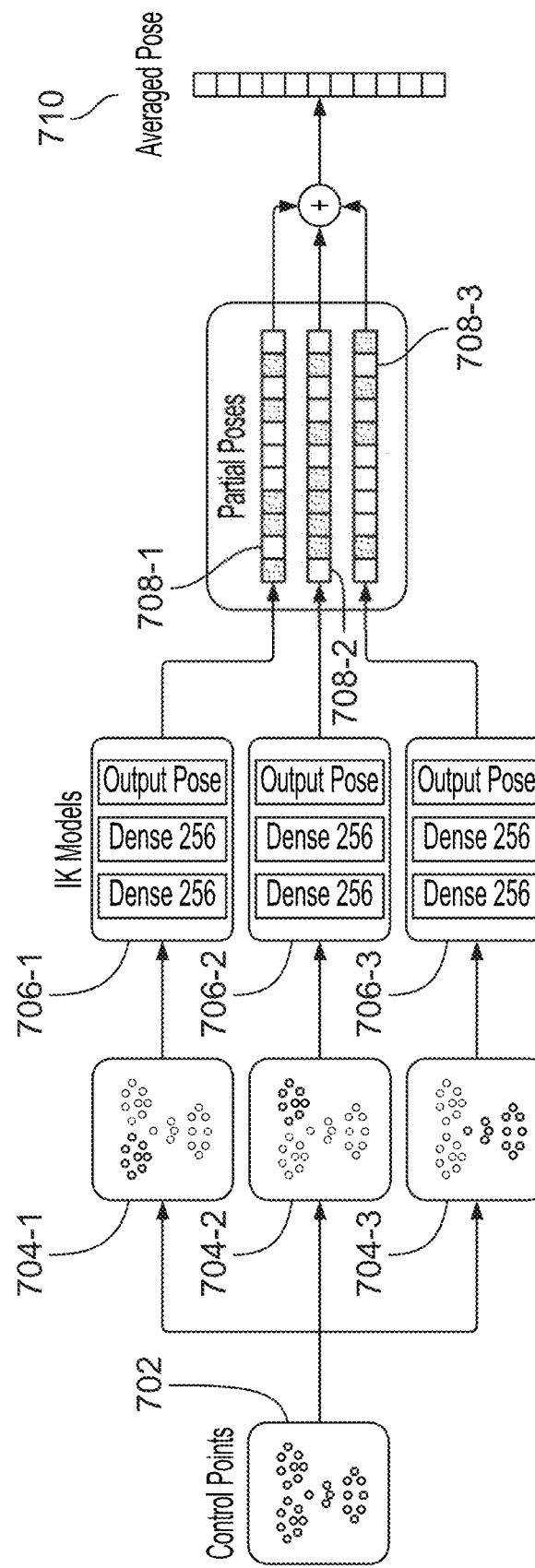
FIG. 7 is a diagram of an inverse kinematics (IK) model according to at least one embodiment.

FIG. 7 is a diagram of an IK model according to at least one embodiment. Control points 702 are divided into disjoint subsets and provided to separate dense neural networks. For example, control points are divided into subset 704-1 (corresponding to an eye region), subset 704-2 (corresponding to an opposite eye region) and subset 704-3 (corresponding to a nose-and-mouth region). The control points of the subset 704-1 are input to dense neural network 706-1. Similarly, the control points of the subset 704-2 are input to dense neural network 706-2, and the control points of the subset 704-3 are input to dense neural network 706-3.

Each of the network 706-1, 706-2 and 706-3 outputs a respective subset of the pose. For example, the network 706-1 outputs subset 708-1 of the pose. Similarly, the network 706-2 outputs subset 708-2 of the pose, and the network 706-3 outputs subset 708-3 of the pose. The valid values from the outputs (from the output subsets 708-1, 708-2 and 708-3) are averaged together to produce the final averaged rig parameter pose 710. Similar to the facial approximation model, the IK model may be optimized with Adam using the same training schedule and balanced dataset described earlier.

As described, the IK model is trained using control points from deformed meshes computed through the rig function. Thus, the training data may only contain examples of control points that can be matched exactly with the appropriate rig parameters. However, when evaluating the IK model, a user might configure the control points in a manner such that a rig cannot precisely match the points. To account for this use case, noise may be added to the control points during training. Given a training sample $\nabla_C$, a new sample is computed as $\nabla'_C = \nabla_C + U(-\delta, \delta)^{|C| \times 3}$ for some user-defined $\delta > 0$. This new data point may be created by adding uniformly random noise to the position of each control point. Based on experimental data, it was observed that $\delta = 4$ mm produces reasonable results. Although the IK model is trained with this new data $V_C$, all other aspects of model training remained identical (or similar).

Results produced by methods according to one or more embodiments will now be described in more detail.

One or more methods of approximation work with film-quality facial rigs that are, for example, used in computer-animated film production. The rigs may be deformed through a combination of a free-form shaping system and a curve-based pose interpolation system. The systems for deforming may be layered for coarse to fine control of the mesh to facilitate art-directable facial rigging of a corresponding character. The rigs may be implemented as node-based computational graphs—for example, computational graphs having more than 10,000 nodes—that are used to compute facial deformations. The nodes implement a wide variety of functions such as basic arithmetic operators and spline interpolation. The rig system also supports custom-written nodes that can execute arbitrary code.

Results will be described with reference to four example facial rigs. Three of these rigs are proprietary facial rigs used in the feature film "How to Train Your Dragon: The Hidden World" for the characters Hiccup, Valka, and Toothless. The fourth example facial rig is a facial rig from the publicly available open-source character, Ray, published by the CGTarian Animation and VFX Online School.

Results of one or more methods of approximation will be compared against those of linear blend skinning (LBS) approximations and a dense feed-forward version of approximation models disclosed herein. Based on these comparisons, it can be observed that one or more of the disclosed methods preserve high-frequency details, which are lost in the LBS approximations, and that one or more disclosed methods produce results that are more accurate than those produced by the dense versions for three out of the four example facial rigs. Furthermore, unlike the LBS approximations, one or more disclosed models preserve the mapping from rig parameters to the deformed mesh, which allows approximation of novel animations without requiring access to the original rig function.

TABLE 1 shows statistics of each model as trained on the four example facial rigs. The models were not used to approximate either the hair or the eyeballs of the characters. However, the models were used to approximate the interior of the mouth as well as the teeth.

TABLE 1

|  | Hiccup | Valka | Toothless | Ray |
| --- | --- | --- | --- | --- |
| Vertices | 12,510 | 12,828 | 14,080 | 4,922 |
| Rig Parameters | 258 | 265 | 286 | 99 |
| Coarse Segments | 10 | 9 | 18 | 6 |
| Refinement Segments | 4 | 3 | 4 | 3 |
| Rigid Segments | 26 | 24 | 110 | 2 |
| Model Size | 8.66 MB | 7.39 MB | 12.97 MB | 5.08 MB |
| Dense Size | 25.96 MB | 27.32 MB | 31.66 MB | 24.19 MB |

Figure 8:
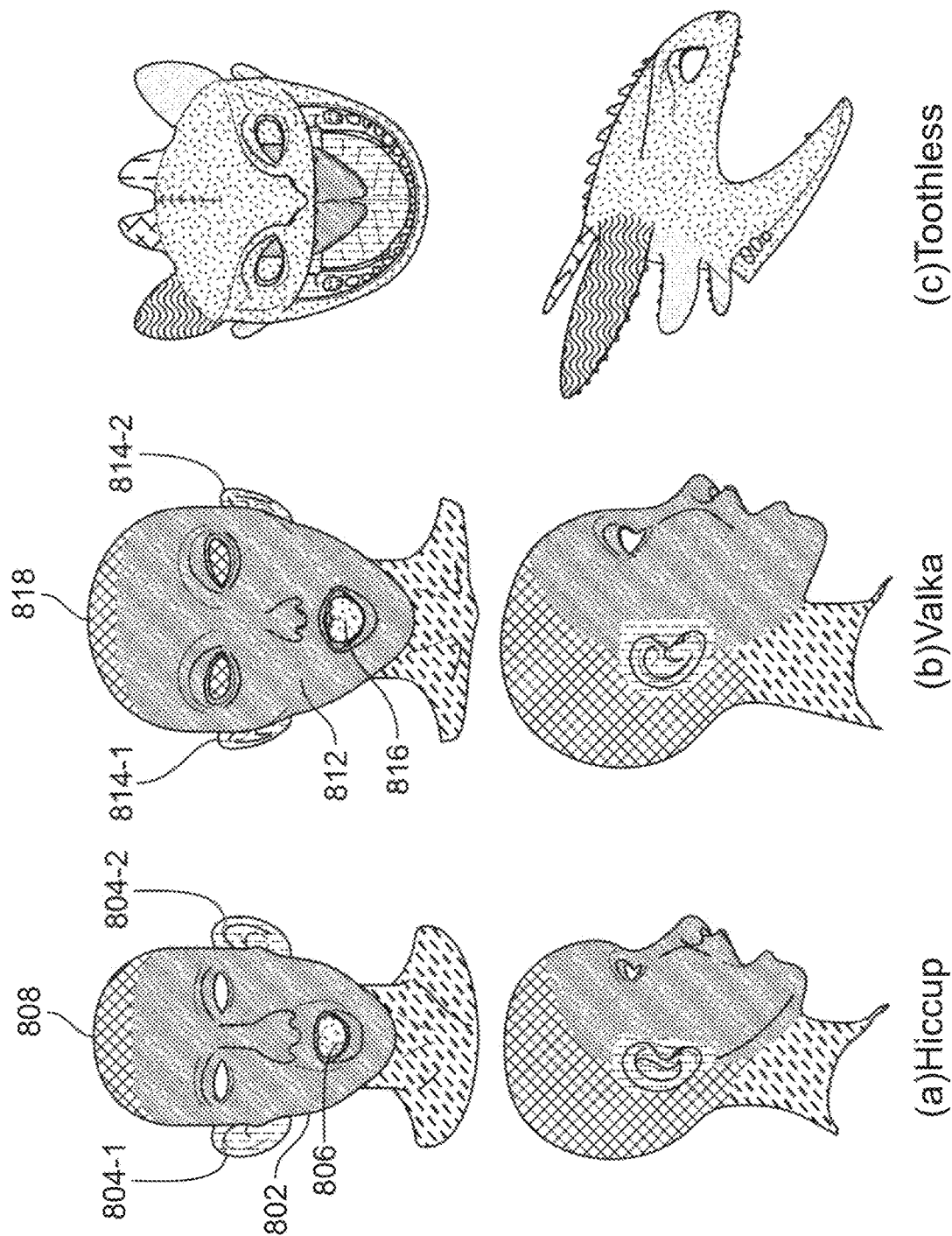
FIG. 8 illustrates examples of the mesh segments used during coarse modeling according to at least one embodiment.
Figure 9:
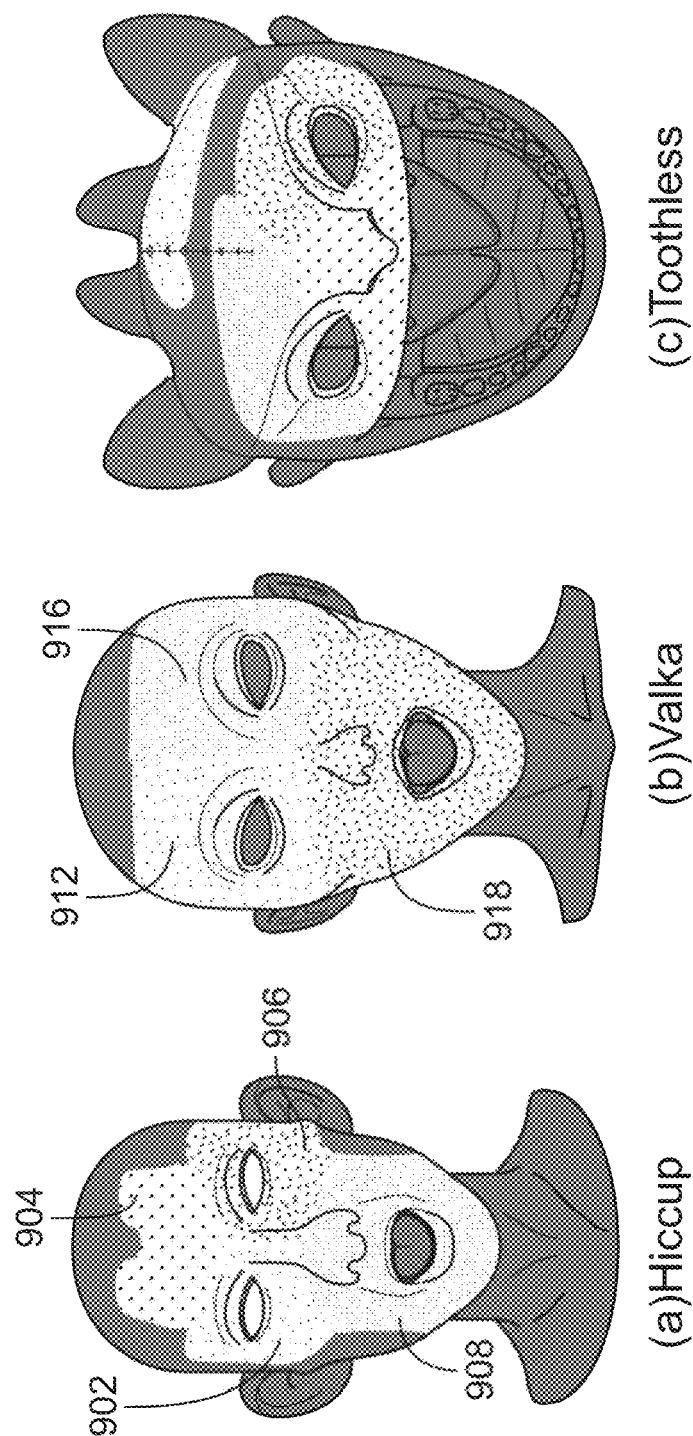
FIG. 9 illustrates examples of the mesh segments used during refined modeling according to at least one embodiment.

FIG. 8 illustrates examples of the mesh segments for the facial models of Hiccup, Valka, and Toothless (e.g., the mesh segments used during coarse modeling), and FIG. 9 illustrates examples of the mesh segments used during the refinement stage of the approximation (e.g., refined modeling).

More particularly, according to one set of examples, FIG. 8(a) illustrates the coarse mesh segments for the facial model of Hiccup, FIG. 8(b) illustrates the coarse mesh segments for the facial model of Valka, and FIG. 8(c) illustrates the coarse mesh segments for the facial model of Toothless. Each coarse mesh segment is represented as a continuous region of a same shading. For example, FIG. 8(a) illustrates regions 802, 804-1, 804-2, 806 and 808. Region 802 corresponds to a largest region of Hiccup's face. Region 806 corresponds to the interior of Hiccup's mouth, and region 808 corresponds to his scalp. Regions 804-1 and 804-2 correspond to Hiccup's ears.

As another example, FIG. 8(b) illustrates regions 812, 814-1, 814-2, 816 and 818. Region 802 corresponds to a largest region of Valka's face. Region 816 corresponds to the interior of Valka's mouth, and region 818 corresponds to his scalp. Regions 814-1 and 814-2 correspond to Valka's ears.

Similarly, FIG. 8(c) illustrates regions for the facial model of Toothless corresponding to segments for coarse approximation.

As noted earlier, FIG. 9 shows examples of the mesh segments used for the refinement stage of the approximation. With respect to FIG. 9, regions that are illustrated as being shaded using a solid pattern indicate segments that are unused in the refinement model.

More particularly, according to one set of examples, FIG. 9(a) illustrates the refined mesh segments for the facial model of Hiccup, FIG. 9(b) illustrates the refined mesh segments for the facial model of Valka, and FIG. 9(c) illustrates the refined mesh segments for the facial model of Toothless. Each refined mesh segment is represented as a continuous region of a same shading. For example, FIG. 9(a) illustrates regions 902, 904, 906, and 908, each of which is a sub-region with respect to region 802 of FIG. 8(a). Region 904 corresponds to a region of Hiccup's forehead. Region 902 corresponds to a first eye region, and region 906 corresponds to an opposite eye region. Region 908 correspond to a region around Hiccup's nose and mouth. With respect to FIG. 8(a), regions that are illustrated using a solid pattern correspond to segments that are unused (e.g., that are not further analyzed) in the refinement model.

As another example, FIG. 9(b) illustrates regions 912, 916 and 918, each of which is a sub-region with respect to region 812 of FIG. 8(b). Region 912 corresponds to a first eye region, and region 916 corresponds to an adjacent eye region. Region 918 corresponds to a region around Valka's nose and mouth. With respect to FIG. 8(b), regions that are illustrated using a solid pattern correspond to segments that are unused (e.g., that are not further analyzed) in the refinement model.

Similarly, FIG. 9(c) illustrates regions for the facial model of Toothless corresponding to segments for coarse approximation.

With reference back to the results listed in TABLE 1, a dense version runs more quickly than disclosed method(s) of approximation, and in one case is more accurate than disclosed method(s) when approximating artist-created animations. However, the faster speed of the dense approximation does come at the cost of more (e.g., a larger number of) model parameters, which translates to higher memory storage costs as seen in TABLE 1. When the dense model fails, there are visible and undesirable artifacts in the deformed mesh, as seen in the facial meshes of Hiccup and Valka in FIG. 11. These artifacts appear as high-frequency noise on the surface of the mesh, and are caused by the dense approximation modeling each component of each vertex as an independent output. In contrast, methods of approximation according to one or embodiments model local neighborhoods in the mesh through the use of CNNs, and inaccuracies in the approximation are less likely to manifest themselves as high-frequency noise as in the dense approximation. Furthermore, disclosed methods of approximation are more accurate than the dense approximation with respect to poses generated through inverse kinematics for all characters.

The accuracy of disclosed methods of approximation was compared to those of an LBS model and a dense feed-forward network having fully connected layers instead of convolutional layers. LBS weights and bone transformations were estimated using the method of Le and Deng (Binh Huy Le and Zhigang Deng, Smooth Skinning Decomposition with Rigid Bones. ACM Trans. Graph. 31, 6, Article 199 (November 2012)). The dense model was trained to approximate vertex offsets, and a separate network was trained for each mesh segment. Each model included two hidden layers each of 256 nodes, and the final output layer produced the offsets for each vertex in the mesh segment. Because the dense network was not constrained by deformation map resolution, an additional refinement model was not trained. However, rigid segments were deformed using the rigid approximation method(s) described earlier. The dense model most closely resembles the method described by Stephen W. Bailey, Dave Otte, Paul Dilorenzo, and James F. O'Brien. 2018. Fast and Deep Deformation Approximations. ACM Trans. Graph. 37, 4, Article 119 (July 2018). With respect to that method, a primary difference in the dense model is that the facial mesh is not linearly deformed by a set of bones before applying the dense neural network.

For each character, all available animation for the rig was collected, and data was randomly split 90%/10% into training and test data, respectively. Training data may be generated using only poses from the training set according to Equation (5). In the case of Ray's rig, access to existing facial animation was not available. Instead, the training data and test sets were generated by sampling the rig parameters in each pose independently from a uniform distribution covering a user-specified range of values for each parameter. This random sampling method does not work when training the approximation models for the other character rigs due to a higher level of complexity in their mesh deformations. To train approximation models disclosed herein as well as the dense models, 50,000 samples for each character were generated. For the LBS models, 16, 24, and 32 bones were fitted to the mesh, and each vertex was allowed to have 8 non-zero weights. In addition, 1,000 samples were generated in order to estimate the vertex weights. Fewer training examples were utilized due to memory and computational constraints.

The test sets for Hiccup, Valka, and Toothless are constructed by taking all unique poses from the test data that were unused for training. Both the vertex position error (in millimeters (mm)) and the face normal error (in degrees) are measured in TABLE 2. The vertex error is the mean distance between the approximated and target vertex positions across the test set. The face normal error is the angle between the approximated and target face normals in the mesh. Specifically, $$E_{normal} = \frac{1}{f}\sum_{i=1}^{f} \arccos(n_i \cdot n_i') \tag{11}$$

where $n_i$ denotes the normal of face i in the ground truth mesh, and $n'_i$ denotes the normal of face i in the approximated mesh with a total of $f$ faces.

TABLE 2

|  | Hiccup | Valka | Toothless | Ray |
| --- | --- | --- | --- | --- |
|  | Distance Error | | | |
| Coarse | 0.36 | 0.43 | 2.01 | 1.00 |
| Refined | 0.27 | 0.37 | 1.81 | 0.40 |
| Dense | 0.37 | 0.98 | 1.55 | 5.00 |
| LBS: 16 Bones | 0.49 | 0.33 | 4.36 | 0.64 |
| LBS: 24 Bones | 0.35 | 0.25 | 2.77 | 0.46 |
| LBS: 32 Bones | 0.24 | 0.21 | 2.35 | 0.44 |
|  | Normal Angle Error | | | |
| Coarse | 1.6 | 1.7 | 3.1 | 3.8 |
| Refined | 0.9 | 1.1 | 2.4 | 1.5 |
| Dense | 1.9 | 5.5 | 1.9 | 8.9 |
| LBS: 16 Bones | 2.0 | 1.9 | 5.2 | 4.2 |
| LBS: 24 Bones | 1.9 | 1.8 | 4.3 | 3.7 |
| LBS: 32 Bones | 1.6 | 1.6 | 4.5 | 4.1 |

Figure 10:
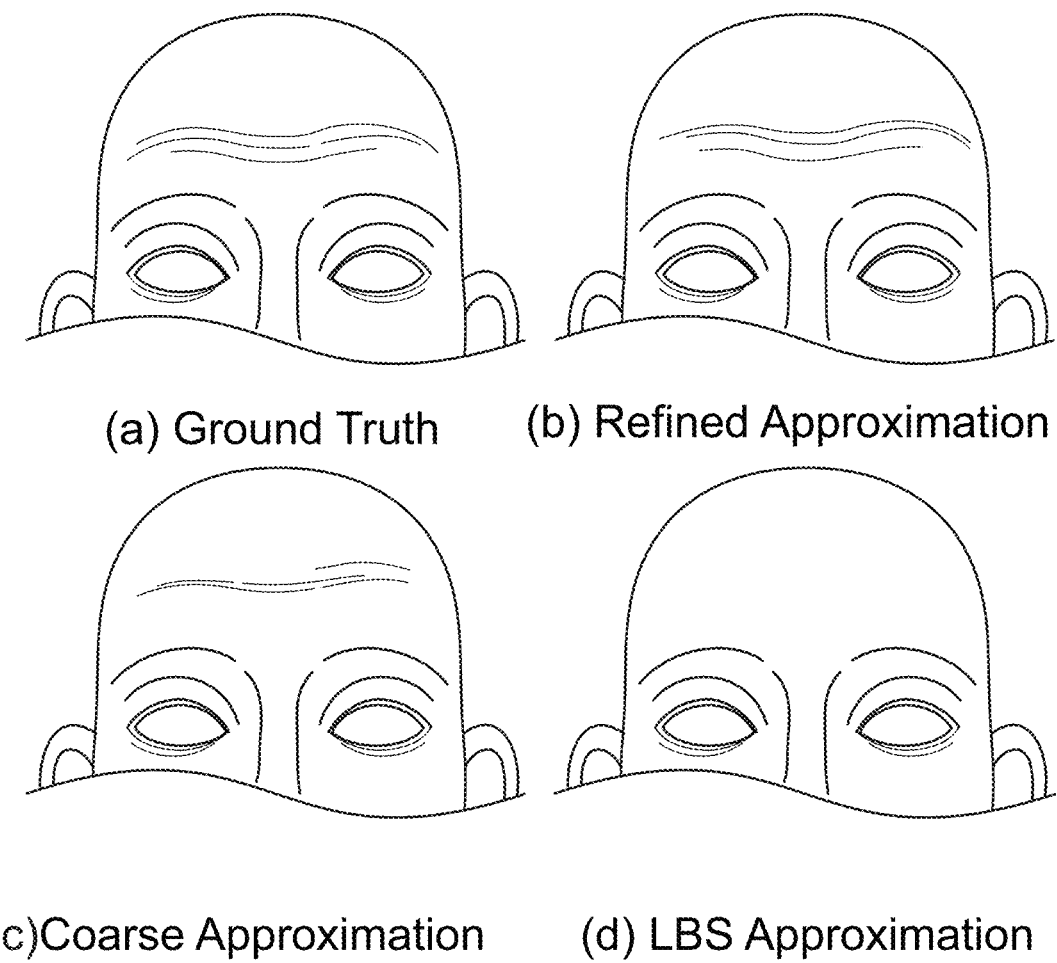
FIG. 10 illustrates approximated deformations for poses of a character that include wrinkles.

According to the results listed in TABLE 2, most approximations achieve submillimeter accuracy on average. However, the average vertex position error is not a good indicator of the accuracy of fine-scale details in the approximations. FIG. 2 illustrates approximated deformations for poses of Toothless that include wrinkles, and FIG. 10 illustrates approximated deformations for poses of Hiccup that include wrinkles. For purposes of comparison, FIG. 10(a) illustrates the ground truth of forehead wrinkles on Hiccup's mesh. FIGS. 10(b) and 10(c) illustrate, respectively, approximated deformations based on a refined approximation and a coarse approximation of the forehead wrinkles according to one or more disclosed embodiments. FIG. 10(d) illustrates an approximated deformation based on an LBS approximation.

Figure 11:
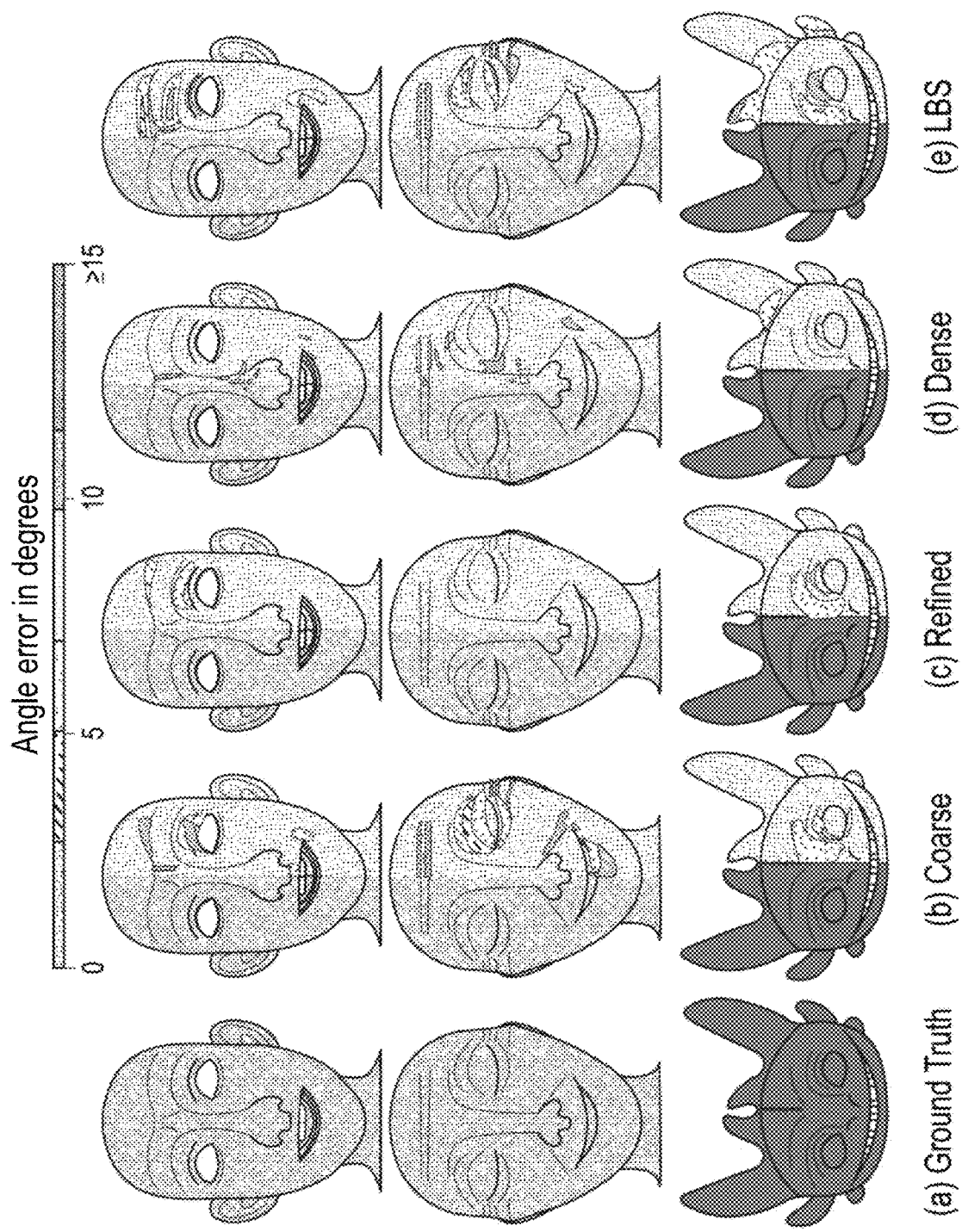
FIG. 11 shows side-by-side comparisons with a visualization of the normal error.

As shown in TABLE 2, the refined approximation produces the smallest normal error for Hiccup, Valka, and Ray. However, the dense model produces the smallest error for Toothless. Such smaller errors indicate that both the refined approximation and the dense approximation can reproduce fine-scale details in the deformed mesh when compared to the coarse approximation and the LBS approximation. FIG. 11 shows side-by-side comparisons with a visualization of the normal error. FIG. 11 illustrates a visual difference between the ground truth mesh evaluated through the original rig function and the rig approximation methods. The heatmap on the right half of each approximation visualizes the angle between the normal vector on the approximation and the corresponding normal on the ground truth mesh. Smaller errors in angle are preferred.

Approximation models disclosed herein were implemented in Python with TensorFlow. Their execution times were evaluated on both a high-end machine and a consumer-quality laptop using both the CPU and the GPU. For the high-end machine, an Intel Xeon E5-2697 v3 processor with 28 threads running at 2.60 GHz was used, along with an NVIDIA Quadro K5200 GPU. On the laptop, an Intel Core i7-7700HQ processor with 8 threads running at 2.80 GHz was used, along with an NVIDIA GeForce GTX 1060. The rotation for the rigid segments was computed by minimizing Equation (3) with the SVD. When evaluating the full approximation with the GPU, this minimization problem was solved on the CPU due to TensorFlow's slow implementation of the SVD on the GPU. Model training time consisted of 2-4 hours spent generating training data through the original rig evaluation engine followed by 2-3 hours of training the coarse approximation model and 2-3 hours for the refined approximation model.

The timing of approximation models disclosed herein was compared against the original rig evaluation software for Hiccup, Valka, and Toothless. These three character rigs were designed for Libee, a multi-threaded rig evaluation engine. Character artists optimized these rigs to run as quickly as possible on the engine. Unlike methods disclosed herein with reference to various embodiments, Libee can only evaluate character rigs on the CPU. TABLE 3 shows the evaluation times using Libee and methods disclosed herein running both on the CPU and the GPU. Disclosed models were timed by taking the average execution time across 1,000 evaluations on single poses.

TABLE 3 illustrates average evaluation time in milliseconds on both the high-end machine and the consumer-quality machine. The coarse approximation is timed by evaluating the coarse model and the rigid deformations. The full approximation is timed by evaluating the coarse model, the refinement model and the rigid deformations. Where indicated, the neural network is evaluated on the GPU, but the rigid components are always evaluated on the CPU.

TABLE 3

|  |  | Hiccup | Valka | Toothless |
|---|---|---|---|---|
| Original Rig | High-End | 75 | 66 | 30 |
| Coarse w/GPU |  | 6.4 | 6.0 | 10.4 |
| Full w/GPU |  | 8.7 | 7.5 | 12.6 |
| Dense w/GPU |  | 2.6 | 2.6 | 4.2 |
| Coarse |  | 2.9 | 2.7 | 4.4 |
| Full |  | 4.2 | 3.8 | 5.6 |
| Dense |  | 2.1 | 2.2 | 2.9 |
| Coarse w/GPU | Consumer | 5.8 | 3.2 | 7.3 |
| Full w/GPU |  | 4.3 | 4.5 | 9.1 |
| Dense w/GPU |  | 1.8 | 1.7 | 7.3 |
| Coarse |  | 6.9 | 2.7 | 5.7 |
| Full |  | 3.5 | 5.2 | 9.0 |
| Dense |  | 3.4 | 2.5 | 3.35 |

Based on the results listed in TABLE 3, approximation models disclosed herein run from 5 to 17 times faster than the original rig evaluation engine. In the case of the high-end machine, the approximation runs more slowly on the GPU because the model is evaluated on a single pose and because the convolutions operate on feature maps with low resolution. Thus, the GPU is underutilized in this case, which leads to slower performance. Furthermore, the GeForce GPU on the consumer-quality machine evaluates the approximation models more quickly than the Quadro GPU on the high-end desktop. This difference can be attributed to the slower clock speed of the Quadro compared with the GeForce GPU.

Approximation methods disclosed herein according to least one embodiment provide a differentiable model that maps rig parameters to the deformed mesh, which can be used for IK applications. Demonstration of use of such approximation methods will now be described with reference to an interactive posing application and a facial landmark-based performance capture system.

First, the interactive posing application will be described in more detail.

A real-time posing application was developed in which the user manipulates a sparse set of control points, and the IK model disclosed earlier with reference to various embodiment computes rig parameters that deform the mesh to match the control points. The user drags the points across the screen, and the mesh is updated interactively. The control points are provided to the system as 2D image coordinates. The IK model is trained to match the points by projecting the mesh onto the image plane and express the point loss term in Equation (9) in terms of distance in image coordinates. The mesh is projected onto the image plane through an orthographic projection with the camera pointing along the Z-axis. Thus, the distance in image coordinates may be computed by only the X- and Y-coordinates of the vertex positions.

The IK model is trained on meshes generated from the same augmented dataset used to train the approximation models. Excluding the time taken to generate the meshes from the original rig function, training took 1-2 hours.

Disclosed methods of approximation were compared with the dense neural network approach. IK models were trained using both coarse and refined methods as the rig approximation $\tilde{r}(p)$. In experiments conducted, the IK models trained with gradients from the dense model for Hiccup, Valka, and Ray produce poses for which the dense approximation generates significantly inaccurate deformations with blatant visual artifacts. For these three characters, poses generated from the IK model trained using gradients from the disclosed approximation methods were used instead. In the case of Toothless's rig, the dense model was evaluated with poses generated from an IK model trained with gradients from the dense approximation. To evaluate the models, 25 user-generated control point configurations were collected. There is no guarantee that these control point configurations can be matched exactly by the original rig. Next, the IK model computes rig parameters for the control points. Finally, a mesh is generated using the approximation method, and a ground truth mesh is generated using the original rig function evaluated on the same rig parameters. The per-vertex distance error and the per-face normal error between the approximated and ground truth meshes were measured. For Toothless, the approximation model is fed poses generated from the IK model trained on its gradients. For Hiccup, Valka, and Ray, both the approximation model and the dense model are fed poses from the IK model trained on gradients from methods disclosed herein.

As seen in TABLE 4, methods disclosed herein more closely match the ground truth mesh evaluated on rig parameters output by the IK model. TABLE 4 shows posing errors measured in mm and degrees. For Toothless, the IK models are trained using gradients from the corresponding approximation. For Hiccup, Valka and Ray, the IK model is trained with gradients from a method according to one or more embodiments and generates rig parameters for both the approach described herein and the dense method.

TABLE 4

| Hiccup | Valka | Toothless | Ray |
|---|---|---|---|
| \multicolumn{4}{c}{Distance Error} | | | |
| 0.94 | 0.70 | 5.49 | 0.58 |
| 1.92 | 2.19 | 11.19 | 4.19 |
| \multicolumn{4}{c}{Normal Angle Error} | | | |
| 2.8 | 1.7 | 3.0 | 1.5 |
| 5.6 | 8.9 | 4.2 | 8.5 |

Figure 12:
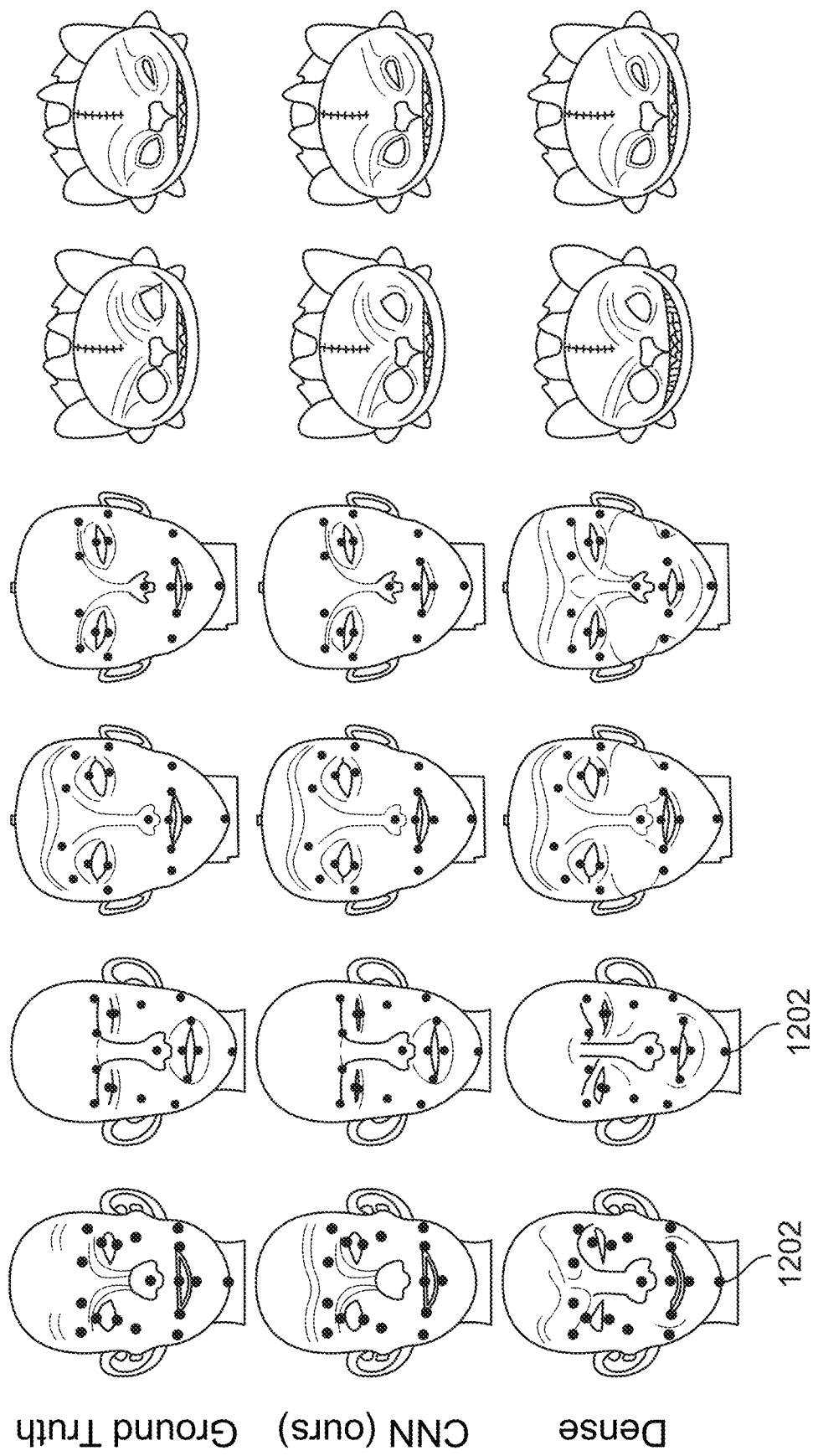
FIG. 12 shows a side-by-side comparison of the ground truth mesh and the approximated deformation for several example control point configurations.

FIG. 12 shows a side-by-side comparison of the ground truth mesh and the approximated deformation for several example control point configurations. Comparison of meshes deformed by rig parameters computed through the IK model is shown. The dots 1202 represent the control points provided to the IK.

The larger difference in accuracy between the disclosed approximation and the dense approximation for Hiccup, Valka, and Toothless can be explained by the types of poses output by the IK model. The IK model is trained in an unsupervised setting, and the distribution of poses output by the model does not exactly match the distribution of poses from the training data. Thus, some poses output by the IK model are dissimilar from the original training data. Higher accuracy on these poses suggests that the disclosed approximation model generalizes to new poses better than the dense model. The results from Ray further support this conclusion. Both the CNN and dense models for Ray are trained on poses sampled uniformly at random. Any pose output by the IK model will lie somewhere within this distribution. As seen in these results, the average approximation error for both the CNN and the dense model for Ray are similar when evaluated on a uniformly random set of poses (see Table 2) and on the set of poses output by the IK model (see Table 4).

Next, a facial landmark-based performance capture system will be described in more detail.

Real-time monocular facial performance capture systems rely on a differentiable rig to map a video recording to an animation sequence. One reference provides a survey of current methods in monocular facial tracking. Because the physical appearance of an actor will not match the appearance of our animated characters, the developed system animates the character by tracking a sparse set of facial landmark points. To track the facial landmarks on an actor, an implementation of the method described in Zhen-Hua Feng, Josef Kittler, Muhammad Awais, Patrik Huber, and Xiaojun Wu, Wing Loss for Robust Facial Landmark Localisation with Convolutional Neural Networks. 2018 IEEE/CVF Conference on Computer Vision and Pattern Recognition (2017), 2235-2245, was used. The model was trained on the same dataset described in that approach. In the developed facial tracking system, 54 out of the 68 landmark points from the dataset were used. The corresponding points on the facial model were manually identified.

Figure 13:
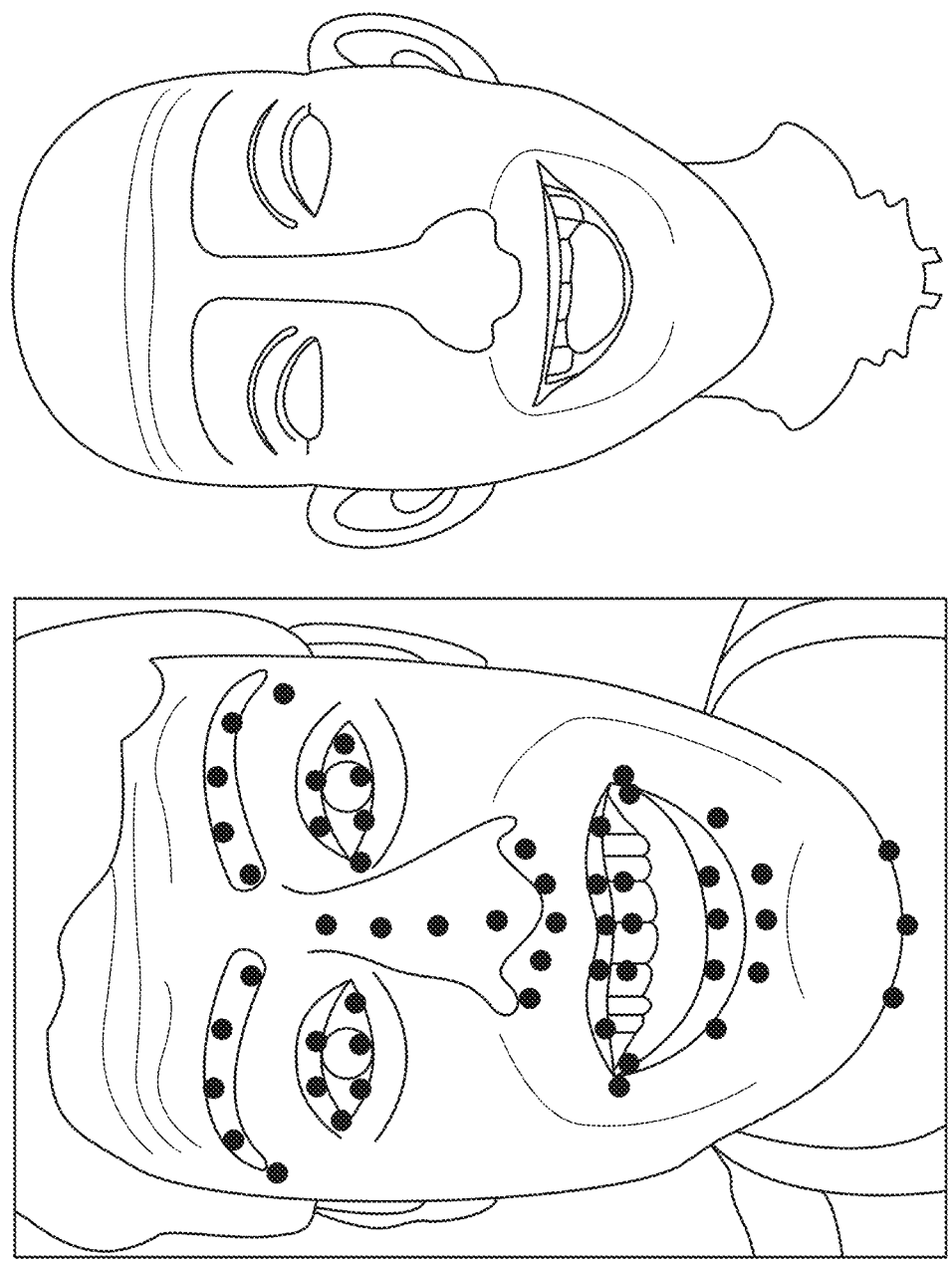
FIG. 13 shows a frame from a recording and the resulting deformed mesh from the input.

To animate the mesh, the movement of the detected landmarks in the recording was tracked and the IK model was used to estimate the rig parameters required to match the new landmark configuration. Because the facial proportions of the actor might differ from those of the animated character, the difference between the actor's expression and the actor's neutral pose was tracked. This difference is then applied to the control points for the IK model. Specifically, let $1^0$ be the detected landmark points on an image of the actor in a neutral expression and let 1 be the coordinates of the detected landmarks in the current expression of the actor. The control points c given to the IK model are then computed as $c=c^0+1-1^0$ where $c^0$ is the control point positions of the mesh in the neutral expression. FIG. 13 shows a frame from a recording and the resulting deformed mesh from the input. In FIG. 13, an example of the developed facial performance capture is shown. The facial landmarks are detected on the input image. The landmark information is passed to the IK model, which computes rig parameter values. The rig parameters are then passed to a disclosed approximation model to produce the deformed target mesh.

Methods disclosed herein according to at least one embodiment provide a fast (or faster) and accurate (or more accurate) approximation of film-quality facial rigs. Based on such approximations, details of fine-grain mesh deformations can be preserved where bone-based approximations are unable to do so. In addition, methods disclosed may provide a differentiable rig approximation, which allows for a wide range of potential new applications for the character rig. As examples, a real-time IK-based posing method was described, as well as a performance facial capture system built on top of the IK solver. Additionally, once the model is trained, methods disclosed may no longer require the original rig function to evaluate mesh deformations. Because the approximations can be implemented with open-source machine learning libraries, the models can be more easily distributed and deployed on many different systems without requiring the complex or proprietary software that was initially used to build the facial rig. Thus, approximation models disclosed herein provide a common format in which facial rigs can be shared without a dependency on the original rigging software. Furthermore, the approximation model parameters can be viewed as a form of rig obfuscation such that the underlying rigging techniques used to create the character are hidden when the model is shared.

Accordingly, methods disclosed herein may be agnostic to the application in which and/or the method with which a facial rig was built. For example, a particular rig may be a Maya rig or a rig built in an application that is proprietary to a particular studio or corporation. According to approximation models disclosed herein, a common format is provided, such that facial rigs can be shared without a dependency on the original rigging software. Here, the common format may include model parameters that are obtained when a model is trained on any particular rig. As such, a level of interoperability may be achieved, such that a common format approximating a facial rig can be more readily moved and/or shared between different digital content creation (DCC) applications and/or tools.

Figure 14:
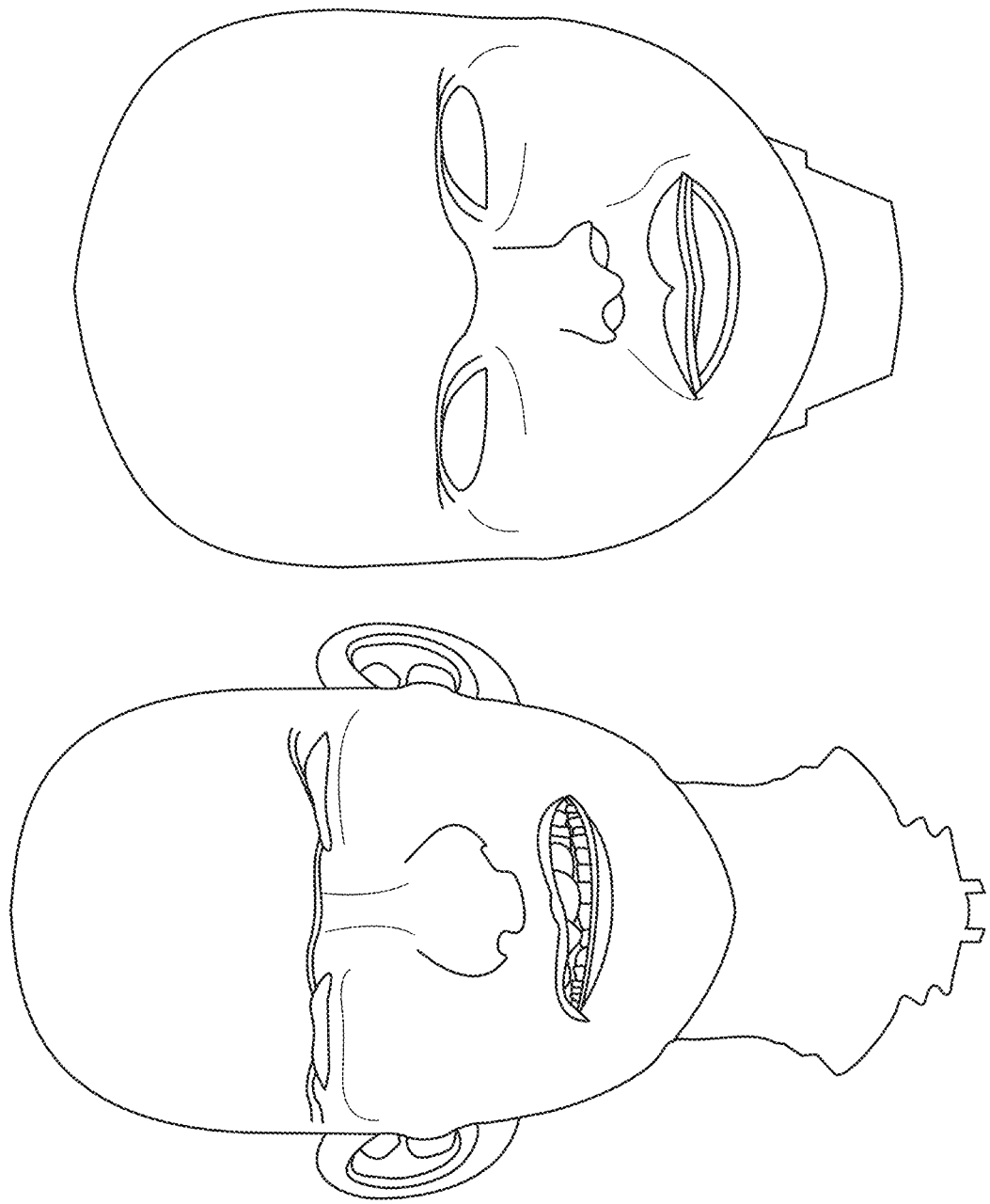
FIG. 14 shows an example of transferring one mesh segment of the coarse approximation model onto a new mesh with a different topology.

Because method(s) disclosed herein according to at least one embodiment is built upon convolutional layers, the model is not necessarily restricted to a single mesh topology. The approximation model trained on a certain mesh can deform a novel mesh not seen during training. As long as the texture coordinates of the facial features in the new mesh align with the texture coordinates of the original, the approximation rig can be transferred to the new facial mesh. In this case, the approximation models output the deformation maps using the same set of input rig parameters. Vertex offsets for the new mesh are computed by sampling deformation maps at new texture coordinates corresponding with the new mesh. FIG. 14 shows an example of transferring one mesh segment of the coarse approximation model onto a new mesh with a different topology. In this example, the texture coordinates are manually aligned to those of the original mesh. For example, FIG. 14 illustrates rig approximation of Hiccup transferred to a new mesh with a different topology. A single mesh segment from the coarse approximation is applied to the new mesh on the right. The facial mesh on the right is from the freely available Mathilda Rig.

The approximation method according to at least one embodiment outputs vertex offsets in a world coordinate system. As a result, the deformations applied to a new mesh might appear undesirable if the facial proportions of the mesh differ significantly from the original model. A different parameterization of the offsets output by the approximation model could help alleviate this issue and allow method(s) disclosed herein to transfer the approximation from one rig to a facial mesh with significantly different proportions.

In examples described herein, vertex normals are computed separately, and are not considered as part of the approximation model. However, in certain real-time applications, recomputing normals from a deformed mesh is avoided to save computational time. Although experiments with approximating vertex normals were not conducted in disclosed methods, the methods could easily be extended to approximate normals as well. Instead of outputting 3 channels in the deformation maps, the network could output additional channels for the normal directions, and an additional loss term could be included to train the model to output accurate normal vectors. Due to the small resolution of the intermediary feature maps, this approach would may only be appropriate for approximating vertex or face normals. Normal maps or other high-resolution maps such as ambient occlusion maps may need to be created using other means.

In at least one embodiment, the texture coordinates provided with each character rig were used to interpolate from deformation maps to vertex offsets. Although these coordinates work well for mapping textures to the mesh surface, they might not be well-suited for an approximation method according to embodiments disclosed herein. For example, the texture coordinates for the upper lip and lower lip of a character's mouth could be near each other. Vertices on the lower lip can move far away from the upper lip when the mouth opens. If the texture coordinates are sufficiently close together, then vertices on both lips might lie on the same pixel in the deformation map. If this were the case, then visually the lips would appear stuck together when the mouth opens, which would be an inaccurate deformation. To avoid these types of issues, new deformation map coordinates could be generated specifically for this approximation task rather than relying on pre-existing texture coordinates.

Figure 15:
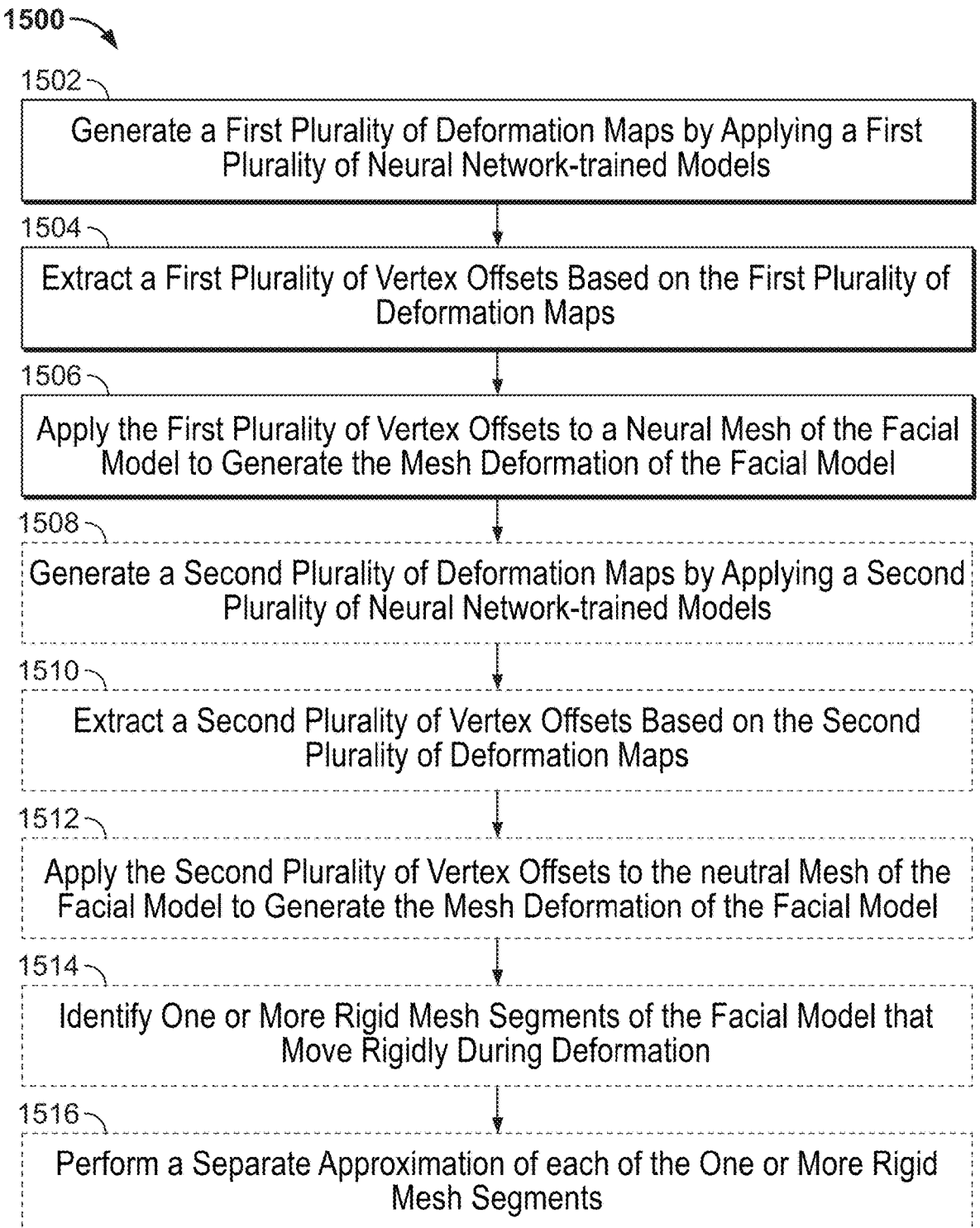
FIG. 15 is a flowchart showing a method according to at least one embodiment of the present disclosure.

FIG. 15 is a flowchart of a method 1500 for generating a mesh deformation of a facial model according to at least one embodiment.

At block 1502, a first plurality of deformation maps is generated by applying a first plurality of neural network-trained models.

In at least a further embodiment, each of the first plurality of neural network-trained models includes a convolutional neural network (CNN) model.

For example, with reference to FIG. 3, deformation maps 306 are generated by applying the coarse approximation models 304. Each of the coarse approximation models 304 may include a CNN model.

At block 1504, a first plurality of vertex offsets is extracted based on the first plurality of deformation maps.

In at least a further embodiment, extracting the first plurality of vertex offsets includes performing an interpolation of at least one of the first plurality of deformation maps at a plurality of vertex positions. The interpolation may include a bilinear interpolation or a cubic interpolation.

For example, with reference to FIG. 3, vertex offsets are extracted based on the deformation maps 306. The extraction may include performing an interpolation of at least one of the deformation maps 306 at one or more vertex positions (e.g., UV coordinates). The interpolation that is performed may be a bilinear interpolation or a cubic interpolation.

At block 1506, the first plurality of vertex offsets is applied to a neutral mesh of the facial model to generate the mesh deformation of the facial model.

In at least a further embodiment, applying the first plurality of vertex offsets to the neutral mesh of the facial model includes adding the first plurality of vertex offsets to values of a plurality of vertices of the neutral mesh.

For example, with reference to FIG. 3, the vertex offsets are applied to the neutral mesh 312 of the facial model to generate the approximated mesh deformation 316. The vertex offsets may be applied by adding (e.g., at adder 310) the vertex offsets to the vertices of the neutral pose of the mesh 312.

In at least a further embodiment, at block 1508, a second plurality of deformation maps is generated by applying a second plurality of neural network-trained models, the second plurality of deformation maps having a resolution greater than the first plurality of deformation maps.

For example, with reference to FIG. 3, deformation maps 326 are generated by applying the refined approximation models 324. The deformation maps 326 have a resolution greater than the deformation maps 306.

In at least a further embodiment, at block 1510, a second plurality of vertex offsets is extracted based on the second plurality of deformation maps.

For example, with reference to FIG. 3, vertex offsets are extracted based on the deformation maps 326. The extraction may include performing an interpolation of at least one of the deformation maps 326 at one or more vertex positions (e.g., UV coordinates). The interpolation that is performed may be a bilinear interpolation or a cubic interpolation.

In at least a further embodiment, at block 1512, the second plurality of vertex offsets is applied to the neutral mesh of the facial model to generate the mesh deformation of the facial model.

In a yet further embodiment, the first plurality of vertex offsets is applied to the neutral mesh by applying the first plurality of vertex offsets to values of all vertices of the neutral mesh. The second plurality of vertex offsets is applied to the neutral mesh by applying the second plurality of vertex offsets to values of at most a subset of the vertices of the neutral mesh to generate the mesh deformation. The subset of the vertices of the neutral mesh may correspond to one or more regions of the neutral mesh exhibiting a level of approximation error that is above a particular threshold.

For example, with reference to FIG. 3, the vertex offsets (extracted based on the deformation maps 326) are applied to the neutral mesh 312 of the facial model to generate the approximated mesh deformation 316.

The vertex offsets (extracted based on the deformation maps 306) may be applied to the neutral mesh 312 by applying these vertex offsets to values of all vertices of the neutral mesh 312. The vertex offsets (extracted based on the deformation maps 326) may be applied to the neutral mesh 312 by applying these vertex offsets to values of at most a subset of the vertices of the neutral mesh 312 to generate the approximated mesh deformation 316. The subset of the vertices of the neutral mesh 312 may correspond to one or more regions of the neutral mesh exhibiting a level of approximation error that is above a particular threshold.

In at least a further embodiment, the first plurality of vertex offsets are applied to the neutral mesh of the facial model by adding the first plurality of vertex offsets to values of a plurality of vertices of the neutral mesh to generate a plurality of intermediary vertex values. The second plurality of vertex offsets are applied to the neutral mesh by adding the second plurality of vertex offsets to at most a subset of the plurality of intermediary vertex values to generate the mesh deformation.

For example, with reference to FIG. 3, the vertex offsets (extracted based on the deformation maps 306) are applied to the neutral mesh 312 by adding (e.g., at adder 310) the vertex offsets to values of a plurality of vertices of the neutral mesh to generate a plurality of intermediary vertex values (e.g., see output of adder 310). The vertex offsets (extracted based on the deformation maps 326) are applied to the neutral mesh 312 by adding (e.g., at adder 314) the vertex offsets to at most a subset of the plurality of intermediary vertex values to generate the approximated mesh deformation 316.

In at least a further embodiment, at block 1514, based on the first plurality of deformation maps and the second plurality of deformation maps, one or more rigid mesh segments of the facial model that move rigidly during deformation are identified. A separate approximation of each of the one or more rigid mesh segments is performed.

Performing the separate approximation of each of the one or more rigid mesh segments may include performing a rigid rotation and translation for vertices of the rigid mesh segment.

For example, with reference to FIG. 5, a rigid mesh segment corresponding to triangle 502 is identified. A separate approximation of the mesh segment corresponding to the triangle 502 is performed. With reference to FIG. 5, a rigid rotation and translation for dots 506 of the line 504 may be performed.

Figure 16:
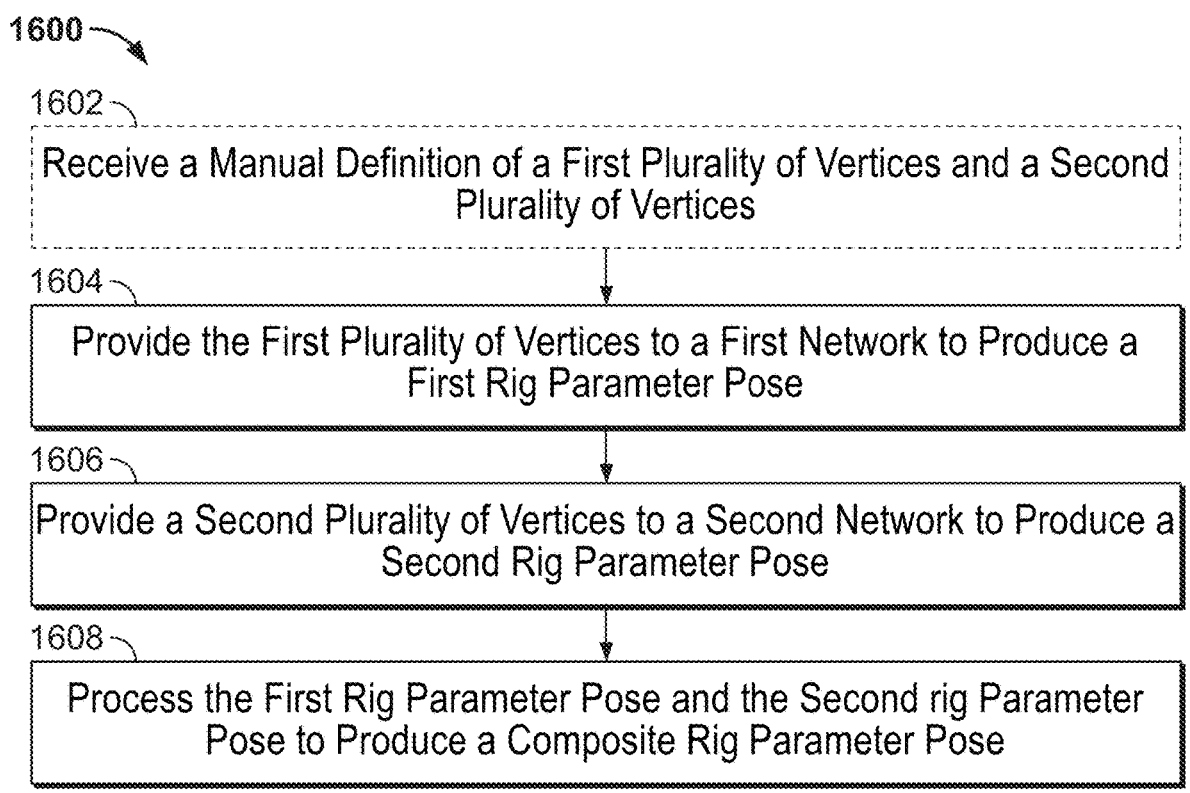
FIG. 16 is a flowchart showing a method according to at least one embodiment of the present disclosure.

FIG. 16 is a flowchart of a method 1600 for generating an approximation of a deformation of a facial model according to at least one embodiment.

According to at least a further embodiment, at block 1602, a manual definition of a first plurality of vertices and a second plurality of vertices is received.

For example, with reference to FIG. 7, a definition of control points 702 (including a subset 704-1 and a subset 704-2) is received from a user.

The first plurality of vertices may include a first plurality of inverse kinematics (IK) control points, and the second plurality of vertices may include a second plurality of IK control points.

The first plurality of IK control points may correspond to a first region of the facial model, and the second plurality of IK control points may correspond to a second region of the facial model that is disjoint with respect to the first region.

For example, with reference to FIG. 7, the subset 704-1 includes a first plurality of inverse IK control points that correspond to a first region corresponding to a first eye (e.g., right eye) of the facial model. The subset 704-2 includes a second plurality of inverse IK control points that correspond to a second region corresponding to a second eye (e.g., left eye) of the facial model.

At block 1604, the first plurality of vertices is provided to a first network to produce a first rig parameter pose. The first network may include a first dense neural network model. The first dense neural network model may include a first plurality of convolutional layers.

For example, with reference to FIG. 7, the control points of the subset 704-1 are input to a dense neural network 706-1 to produce a subset 708-1.

At block 1606, the second plurality of vertices is provided to a second network to produce a second rig parameter pose. The second network may include a second dense neural network model. The second dense neural network model may include a second plurality of convolutional layers.

For example, with reference to FIG. 7, the control points of the subset 704-2 are input to a dense neural network 706-2 to produce a subset 708-2.

At block 1608, the first rig parameter pose and the second rig parameter pose are processed to produce a composite rig parameter pose. The composite rig parameter pose corresponds to the approximation of the deformation of the facial model.

Processing the first rig parameter pose and the second rig parameter pose may include producing one or more average values of the first rig parameter pose and the second rig parameter pose.

For example, with reference to FIG. 7, valid values from the outputs (include the output subsets 708-1, 708-2) are averaged together to produce the final averaged rig parameter pose 710.

Utilizing embodiments of the present disclosure, accurate approximation of deformations may be achieved in a significantly less amount of time using significantly less amount of computing resources as compared with the original deformation functions requiring far more time and computing resources. Particularly in comparison with other known deformation techniques, embodiments of the present disclosure achieve far more accurate results in less computing time when compared with the ground truth deformation results.

Figure 17:
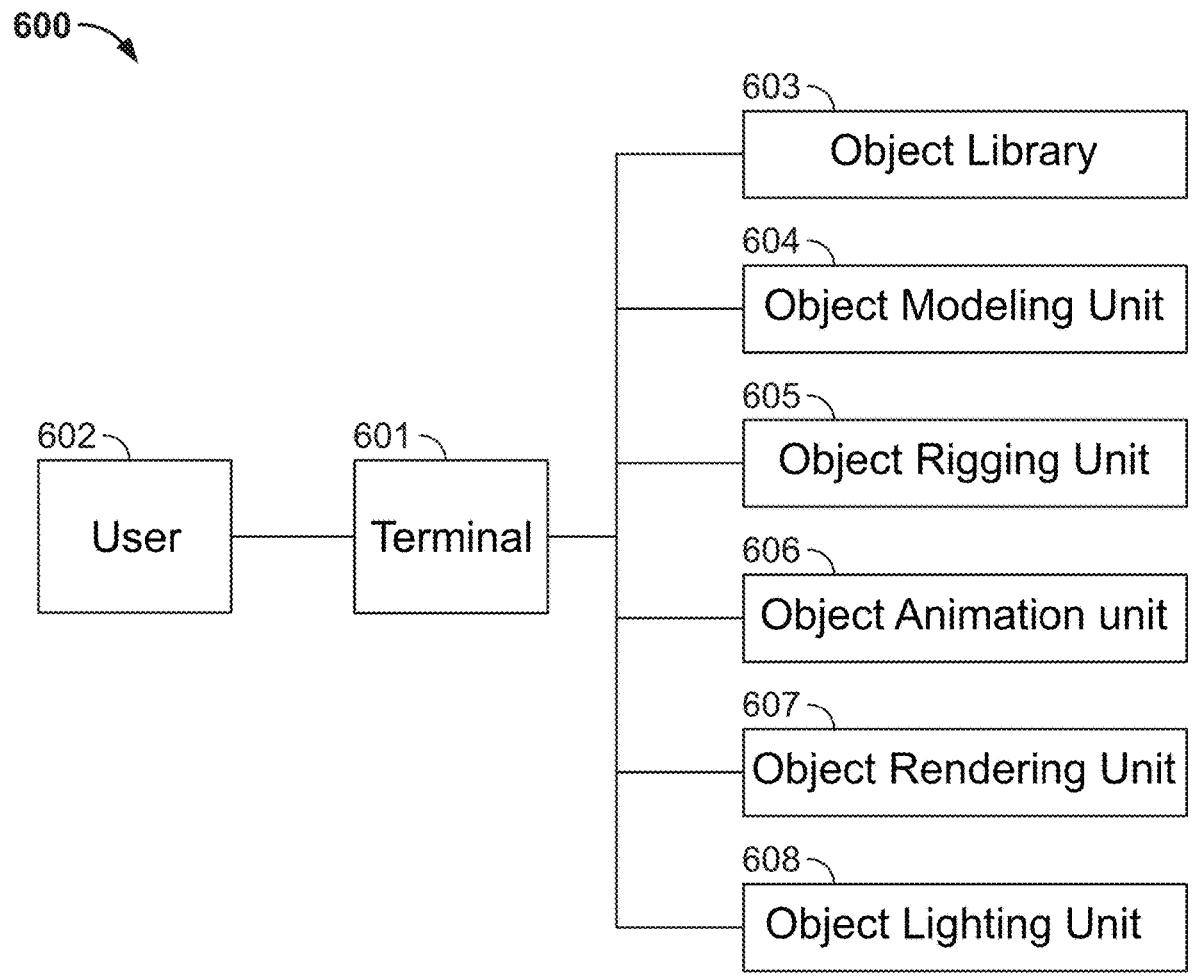
FIG. 17 is a diagram of a system implemented according to an embodiment of the present disclosure.

Referring now to FIG. 17, a simplified block diagram of a system 600 for creating computer graphics imagery (CGI) and computer-aided animation is shown that may implement or incorporate various embodiments of the present disclosure. The system 600 may include one or more terminals 601. The one or more terminals 601 may include hardware and software elements configured for designing CGI and assisting with computer-aided animation. The terminals 601 may be implemented as a single computing device or a set of one or more computing devices, corresponding to computer hardware and/or software.

Examples of terminals 601 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 601 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 600, a user 602 may utilize the one or more terminals 601 to design, create, or modify objects within a computer-generated interface displayed on display associated with the terminal 601.

The terminal may implement, include, or otherwise be in operable communication with, systems and units including object library 603, object modeling unit 604, object rigging unit 605, object animation unit 606, object rendering unit 607, and object lighting unit 608. Object library 603 may include software and/or hardware elements configured for storing and accessing information related to objects to be accessed, requested, retrieved, and/or used by the one or more terminals 601 to design, create, and modify 3D models of objects in the CGI and animation processes.

Object modeling unit 604 may include software and/or hardware elements and information to be accessed, requested, retrieved, and/or used by the one or more terminals 601 to sculpt and design the 3D model to take on the desired appearance as instructed by user 602, or other terminal operator during the CGI and animation process.

Object rigging unit 605 may include software and/or hardware elements and information to be accessed, requested, retrieved, and/or used by the one or more terminals 601 to design, create, or modify components of 3D models to define articulation points and movement ranges of various elements of the 3D model.

Object animation unit 606 may include software and/or hardware elements and information to be accessed, requested, retrieved, and/or used by the one or more terminals 601 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 607 may include software and/or hardware elements and information to be accessed, requested, retrieved, and/or used by the one or more terminals 601 to design, create, or modify a final appearance of the animated 3D model, including generating one or more images of one or more computer-generated objects, including textures, colors, rigging, controls, and the like.

Object lighting unit 608 may include software and/or hardware elements and information to be accessed, requested, retrieved, and/or used by the one or more terminals 601 to design, create, or modify lighting aspects of a 3D model and animated scenes, including defining lighting sources, shading, reflections, refractions, textures, colors, and the like.

The one or more terminals 601 may be in communication with one or more server computers which may operatively in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 603, object modeling unit 604, object rigging unit 605, object animation unit 606, object rendering unit 607, object lighting unit 608, and the like. The one or more terminals 601, the one or more server computers, or any other aspect of the system 600, may be associated or coupled with a display configured to display information, including a displayed interface for displaying, performing, executing, instructing, reviewing, and/or selecting operations of the present disclosure.

Figure 18:
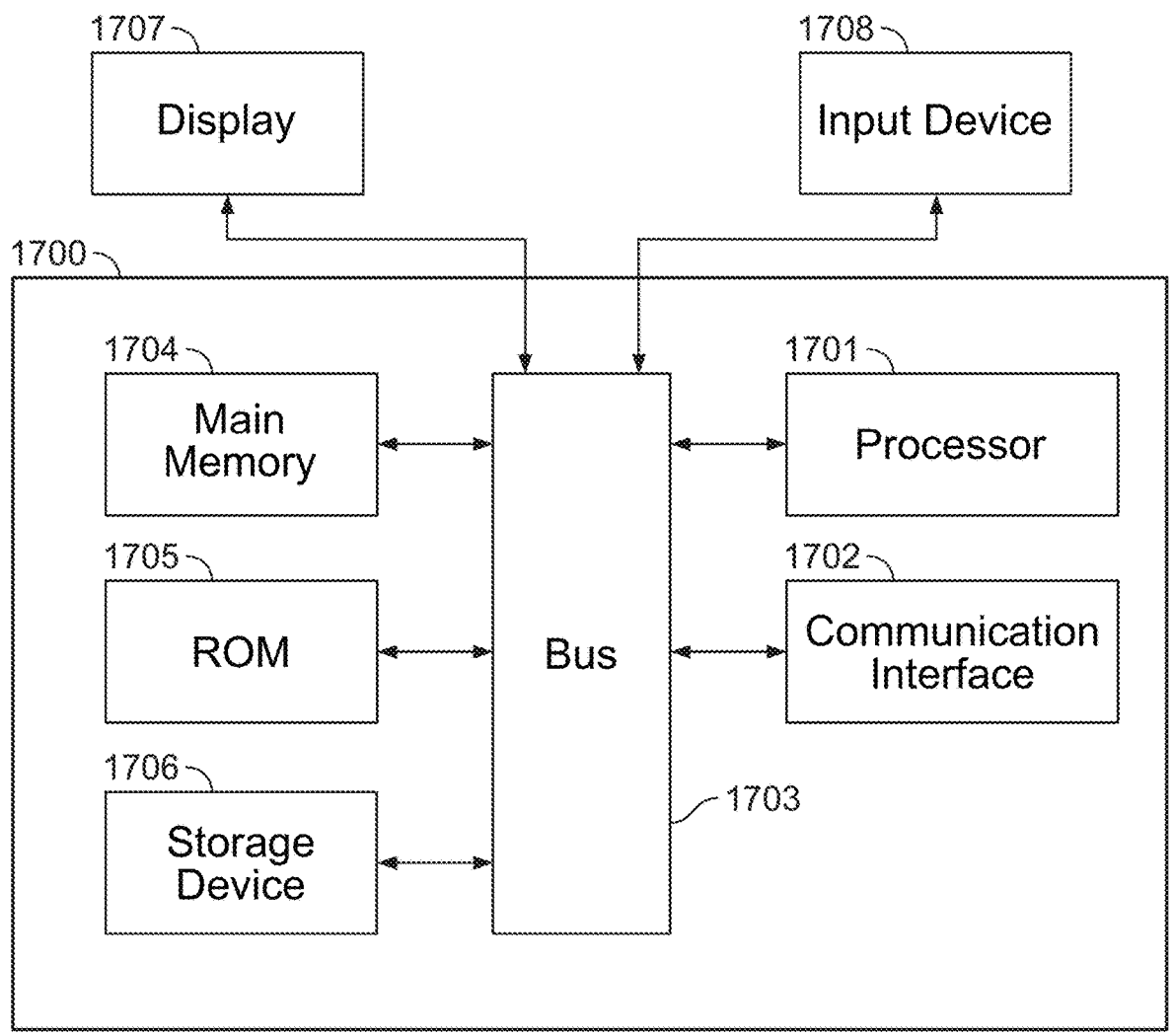
FIG. 18 is a diagram of an apparatus implemented according to an embodiment of the present disclosure.

Referring to FIG. 18, an illustration of an example computer 1700 is provided. One or more of aspects of the system 600 discussed above in FIG. 17, such as the one or more terminals 600 or the one or more server computers, may be configured as or include such a computer 1700. In selected embodiments, the computer 1700 may include a bus 1703 (or multiple buses) or other communication mechanism, a processor 1701, main memory 1704, read only memory (ROM) 1705, one or more additional storage devices 1706, and/or a communication interface 1702, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1703 or other communication mechanism, including multiple such buses or mechanisms, may support communication of information within the computer 1700. The processor 1701 may be connected to the bus 1703 and process information. In selected embodiments, the processor 1701 may be a specialized or dedicated microprocessor configured to perform particular tasks in accordance with the features and aspects disclosed herein by executing machine-readable software code defining the particular tasks. Main memory 1704 (e.g., random access memory—or RAM—or other dynamic storage device) may be connected to the bus 1703 and store information and instructions to be executed by the processor 1701. Main memory 1704 may also store temporary variables or other intermediate information during execution of such instructions.

ROM 1705 or some other static storage device may be connected to a bus 1703 and store static information and instructions for the processor 1701. An additional storage device 1706 (e.g., a magnetic disk, optical disk, memory card, or the like) may be connected to the bus 1703. The main memory 1704, ROM 1705, and the additional storage device 1706 may include a non-transitory computer-readable medium holding information, instructions, or some combination thereof, for example instructions that when executed by the processor 1701, cause the computer 1700 to perform one or more operations of a method as described herein. A communication interface 1702 may also be connected to the bus 1703. A communication interface 1702 may provide or support two-way data communication between a computer 1700 and one or more external devices (e.g., other devices contained within the computing environment).

In selected embodiments, the computer 1700 may be connected (e.g., via a bus) to a display 1707. The display 1707 may use any suitable mechanism to communicate information to a user of a computer 1700. For example, the display 1707 may include or utilize a liquid crystal display (LCD), light emitting diode (LED) display, projector, or other display device to present information to a user of the computer 1700 in a visual display. One or more input devices 1708 (e.g., an alphanumeric keyboard, mouse, microphone, stylus pen) may be connected to the bus 1703 to communicate information and commands to the computer 1700. In selected embodiments, one input device 1708 may provide or support control over the positioning of a cursor to allow for selection and execution of various objects, files, programs, and the like provided by the computer 1700 and displayed by the display 1707.

The computer 1700 may be used to transmit, receive, decode, display, or the like one or more video files. In selected embodiments, such transmitting, receiving, decoding, and displaying may be in response to the processor 1701 executing one or more sequences of one or more instructions contained in main memory 1704. Such instructions may be read into main memory 1704 from another non-transitory computer-readable medium (e.g., a storage device).

Execution of sequences of instructions contained in main memory 1704 may cause the processor 1701 to perform one or more of the procedures or steps described herein. In selected embodiments, one or more processors in a multi-processing arrangement may also be employed to execute sequences of instructions contained in main memory 1704. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1701, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1702 may provide or support external, two-way data communication to or via a network link. For example, a communication interface 1702 may be a wireless network interface controller or a cellular radio providing a data communication network connection. Alternatively, a communication interface 1702 may comprise a local area network (LAN) card providing a data communication connection to a compatible LAN. In any such embodiment, a communication interface 1702 may send and receive electrical, electromagnetic, or optical signals conveying information.

A network link may provide data communication through one or more networks to other data devices (e.g., one or more terminals 601 as shown in the system 600). For example, a network link may provide a connection through a local network of a host computer or to data equipment operated by an Internet Service Provider (ISP). An ISP may, in turn, provide data communication services through the Internet. Accordingly, a computer 1700 may send and receive commands, data, or combinations thereof, including program code, through one or more networks, a network link, and communication interface 1702. Thus, the computer 1700 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for generating an approximation of a deformation of a facial model, the method comprising:
   receiving a first plurality of vertices;
   generating a first set of rig parameters using a first model based on the first plurality of vertices, the first model comprising a first neural network model;
   receiving a second plurality of vertices;
   generating a second set of rig parameters using a second model based on the second plurality of vertices, the second model comprising a second neural network model; and
   generating a composite set of rig parameters based on the first and second sets of rig parameters,
   wherein:
   the first plurality of vertices comprise a first plurality of control points;
   the second plurality of vertices comprise a second plurality of control points;
   the first plurality of control points correspond to a first region of the facial model;
   the second plurality of control points correspond to a second region of the facial model that is disjoint with respect to the first region;

the first plurality of control points are disjoint with respect to the second plurality of control points;

the first plurality of vertices is provided to the first model based on the first model being associated with the first region; and the second plurality of vertices is provided to the second model based on the second model being associated with the second region.

2. The method of claim 1, further comprising:

generating, using a facial approximation model, the deformation of the facial model based on the composite set of rig parameters, wherein the composite set of rig parameters is based on the first set of rig parameters produced using the first plurality of vertices and on the second set of rig parameters produced using the second plurality of vertices.

3. The method of claim 1, wherein:

the first region corresponds to a first eye of the facial model; and the second region corresponds to a second eye, a nose or a mouth of the facial model.

4. The method of claim 1, wherein generating the composite set of rig parameters comprises averaging one or more values from the first set of rig parameters with one or more values from the second set of rig parameters when the one or more values from the first set of rig parameters and the one or more values from the second set of rig parameters correspond to a same region of the facial model.

5. The method of claim 1, wherein:

the first neural network model comprises a first plurality of convolutional layers; and the second neural network model comprises a second plurality of convolutional layers.

6. The method of claim 1, further comprising:

receiving a manual definition of the first plurality of vertices and the second plurality of vertices.

7. A system for generating an approximation of a deformation of a facial model, the system comprising one or more processors configured to:

receive a first plurality of vertices;

generate a first set of rig parameters using a first model based on the first plurality of vertices;

receive a second plurality of vertices;

generate a second set of rig parameters using a second model based on the second plurality of vertices; and generate a composite set of rig parameters based on the first and second sets of rig parameters, wherein:

the first plurality of vertices comprise a first plurality of control points;

the second plurality of vertices comprise a second plurality of control points;

the first plurality of control points correspond to a first region of the facial model;

the second plurality of control points correspond to a second region of the facial model that is disjoint with respect to the first region;

the first plurality of control points are disjoint with respect to the second plurality of control points;

the first plurality of vertices is provided to the first model based on the first model being associated with the first region; and the second plurality of vertices is provided to the second model based on the second model being associated with the second region.

8. The system of claim 7, wherein the one or more processors are further configured to:

generate, using a facial approximation model, the deformation of the facial model based on the composite set of rig parameters, wherein the composite set of rig parameters is based on the first set of rig parameters produced using the first plurality of vertices and on the second set of rig parameters produced using the second plurality of vertices.

9. The system of claim 7, wherein:

the first region corresponds to a first eye of the facial model; and the second region corresponds to a second eye, a nose or a mouth of the facial model.

10. The system of claim 7, wherein the one or more processors are further configured to generating the composite set of rig parameters by averaging one or more values from the first set of rig parameters with one or more values from the second set of rig parameters when the one or more values from the first set of rig parameters and the one or more values from the second set of rig parameters correspond to a same region of the facial model.

11. The system of claim 7, wherein:

the first model comprises a first neural network model; and the second model comprises a second neural network model.

12. The system of claim 11, wherein:

the first neural network model comprises a first plurality of convolutional layers; and the second neural network model comprises a second plurality of convolutional layers.

13. The system of claim 7, wherein the one or more processors are further configured to:

receive a manual definition of the first plurality of vertices and the second plurality of vertices.

14. A machine-readable non-transitory medium having stored thereon machine-executable instructions for generating an approximation of a deformation of a facial model, the instructions comprising:

receiving a first plurality of vertices;

generating a first set of rig parameters using a first model based on the first plurality of vertices;

receiving a second plurality of vertices;

generating a second set of rig parameters using a second model based on the second plurality of vertices; and generating a composite set of rig parameters based on the first and second sets of rig parameters, wherein:

the first plurality of vertices comprise a first plurality of control points;

the second plurality of vertices comprise a second plurality of control points;

the first plurality of control points correspond to a first region of the facial model;

the second plurality of control points correspond to a second region of the facial model that is disjoint with respect to the first region;

the first plurality of control points are disjoint with respect to the second plurality of control points;

the first plurality of vertices is provided to the first model based on the first model being associated with the first region; and the second plurality of vertices is provided to the second model based on the second model being associated with the second region.

15. The system of claim 7, wherein:
the first plurality of control points comprises a first plurality of inverse kinematics (IK) control points corresponding to the first region of the facial model;
the second plurality of control points comprises a second plurality of IK control points corresponding to the second region of the facial model; and
the first plurality of IK control points are disjoint with respect to the second plurality of IK control points.

16. The method of claim 1, wherein:
the first plurality of control points comprises a first plurality of inverse kinematics (IK) control points corresponding to the first region of the facial model;
the second plurality of control points comprises a second plurality of IK control points corresponding to the second region of the facial model; and
the first plurality of IK control points are disjoint with respect to the second plurality of IK control points.

17. The machine-readable non-transitory medium of claim 14, wherein:
the first plurality of control points comprises a first plurality of inverse kinematics (IK) control points corresponding to the first region of the facial model;
the second plurality of control points comprises a second plurality of IK control points corresponding to the second region of the facial model; and
the first plurality of IK control points are disjoint with respect to the second plurality of IK control points.

* * * * *